(12) United States Patent
Kaehler

(10) Patent No.: US 10,534,954 B2
(45) Date of Patent: Jan. 14, 2020

(54) AUGMENTED REALITY IDENTITY VERIFICATION

(71) Applicant: Magic Leap, Inc., Plantation, FL (US)

(72) Inventor: Adrian Kaehler, Los Angeles, CA (US)

(73) Assignee: Magic Leap, Inc., Plantation, FL (US)

( * ) Notice: Subject to any disclaimer, the term of this patent is extended or adjusted under 35 U.S.C. 154(b) by 39 days.

(21) Appl. No.: 15/611,398

(22) Filed: Jun. 1, 2017

(65) Prior Publication Data
US 2017/0351909 A1    Dec. 7, 2017

Related U.S. Application Data

(60) Provisional application No. 62/345,438, filed on Jun. 3, 2016.

(51) Int. Cl.
| | |
|---|---|
| *G06K 9/00* | (2006.01) |
| *G06K 9/62* | (2006.01) |
| *G06T 19/00* | (2011.01) |

(52) U.S. Cl.
CPC ..... *G06K 9/00288* (2013.01); *G06K 9/00281* (2013.01); *G06K 9/00456* (2013.01); *G06K 9/6215* (2013.01); *G06K 9/6257* (2013.01); *G06T 19/006* (2013.01)

(58) Field of Classification Search
CPC ........... G06K 9/00288; G06K 9/00456; G06K 9/00281; G06K 9/6257; G06K 9/6215; G06T 7/00; G06T 19/006
See application file for complete search history.

(56) References Cited

U.S. PATENT DOCUMENTS

| | | |
|---|---|---|
| 5,291,560 A | 3/1994 | Daugman |
| 6,119,096 A | 9/2000 | Mann et al. |
| 6,505,193 B1 | 1/2003 | Musgrave et al. |
| 6,850,221 B1 | 2/2005 | Tickle |
| 7,817,013 B2 * | 10/2010 | Bazakos ............ G06K 9/00228 340/5.7 |
| 8,950,867 B2 | 2/2015 | Macnamara |
| 9,081,426 B2 | 7/2015 | Armstrong |
| 9,215,293 B2 | 12/2015 | Miller |
| 9,310,559 B2 | 4/2016 | Macnamara |
| 9,348,143 B2 | 5/2016 | Gao et al. |
| D758,367 S | 6/2016 | Natsume |

(Continued)

FOREIGN PATENT DOCUMENTS

WO    WO 2017/210419    12/2017

OTHER PUBLICATIONS

CEX IO Support, "Identity Verification Guide" <https://web.archive.org/web/20160421131221/https://support.cexio/hc/en-us/articles/215744957-Identity-Verification-Guide/> dated Apr. 21, 2016 (Year: 2016).*

(Continued)

*Primary Examiner* — Ming Y Hon
(74) *Attorney, Agent, or Firm* — Knobbe, Martens, Olson & Bear, LLP

(57) ABSTRACT

An augmented reality device (ARD) can present virtual content which can provide enhanced experiences with the user's physical environment. For example, the ARD can detect a linkage between a person in the FOV of the ARD and a physical object (e.g., a document presented by the person) or detect linkages between the documents. The linkages may be used in identity verification or document verification.

14 Claims, 16 Drawing Sheets

(56) References Cited

U.S. PATENT DOCUMENTS

| | | |
|---|---|---|
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| 9,740,006 B2 | 8/2017 | Gao |
| 9,791,700 B2 | 10/2017 | Schowengerdt |
| 9,851,563 B2 | 12/2017 | Gao et al. |
| 9,857,591 B2 | 1/2018 | Welch et al. |
| 9,874,749 B2 | 1/2018 | Bradski et al. |
| 2004/0003295 A1* | 1/2004 | Elderfield .......... G07C 9/00087 713/176 |
| 2004/0130680 A1 | 7/2004 | Zhou et al. |
| 2004/0151347 A1 | 8/2004 | Wisniewski |
| 2008/0112621 A1* | 5/2008 | Gallagher .......... G06K 9/00288 382/190 |
| 2008/0273766 A1* | 11/2008 | Kim ................ G06K 9/00295 382/118 |
| 2009/0322866 A1* | 12/2009 | Stotz ................ G07C 9/00087 348/77 |
| 2011/0153341 A1* | 6/2011 | Diaz-Cortes .......... G16H 10/60 705/2 |
| 2011/0182469 A1 | 7/2011 | Ji et al. |
| 2011/0299741 A1* | 12/2011 | Zhang ................ G06K 9/00228 382/117 |
| 2011/0299783 A1* | 12/2011 | Chotard ............. G06K 9/00228 382/195 |
| 2011/0305374 A1* | 12/2011 | Chou ................ G06F 16/5854 382/118 |
| 2012/0127062 A1 | 5/2012 | Bar-Zeev et al. |
| 2013/0082922 A1 | 4/2013 | Miller |
| 2013/0125027 A1 | 5/2013 | Abovitz |
| 2014/0003762 A1 | 1/2014 | Macnamara |
| 2014/0071539 A1 | 3/2014 | Gao |
| 2014/0177023 A1 | 6/2014 | Gao et al. |
| 2014/0218468 A1 | 8/2014 | Gao et al. |
| 2014/0306866 A1 | 10/2014 | Miller et al. |
| 2014/0380249 A1 | 12/2014 | Fleizach |
| 2015/0016777 A1 | 1/2015 | Abovitz et al. |
| 2015/0103306 A1 | 4/2015 | Kaji et al. |
| 2015/0178580 A1* | 6/2015 | Lai .................... G06K 9/00899 382/116 |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0294139 A1 | 10/2015 | Thompson et al. |
| 2015/0302652 A1 | 10/2015 | Miller et al. |
| 2015/0310040 A1* | 10/2015 | Chan .................... G06F 16/583 707/738 |
| 2015/0326570 A1 | 11/2015 | Publicover et al. |
| 2015/0346490 A1 | 12/2015 | Tekolste et al. |
| 2015/0346495 A1 | 12/2015 | Welch et al. |
| 2016/0011419 A1 | 1/2016 | Gao |
| 2016/0019415 A1 | 1/2016 | Ra et al. |
| 2016/0021293 A1* | 1/2016 | Jensen .................... G06F 16/51 348/349 |
| 2016/0026253 A1 | 1/2016 | Bradski et al. |
| 2016/0127359 A1* | 5/2016 | Minter ................ H04L 63/0861 726/6 |
| 2016/0162729 A1* | 6/2016 | Hagen ................ G06K 9/00288 382/118 |
| 2016/0379041 A1* | 12/2016 | Rhee .................. G06K 9/00208 382/118 |
| 2017/0091570 A1* | 3/2017 | Rao .................... G06K 9/00979 |
| 2018/0032796 A1* | 2/2018 | Kuharenko ............... G06T 1/20 |

OTHER PUBLICATIONS

International Search Report and Written Opinon for PCT Application No. PCT/US2017/35429, dated Oct. 5, 2017.

"California Driver License & Identification Cards—California Secure Card", Department of Motor Vehicles, Oct. 2010, brochure in 2 pages.

Brunelli, R. et al., "Face Recognition: Features versus Templates", IEEE Transactions on Pattern Analysis and Machine Intelligence, vol. 15, No. 10, Oct. 1993, in 11 pages.

Shi, J. et al., "Good Features to Track", IEEE Conference on Computer Vision Pattern Recognition (CVPR94), Jun. 1994, in 8 pages.

Invitation to Pay Additional Fees and, Where Applicable, Protest Fee for PCT Application No. PCT/US17/35429, dated Aug. 7, 2017.

Farabet, C. et al., "Hardware Accelerated Convolutional Neural Networks for Synthetic Vision Systems", Proceedings of the 2010 IEEE International Symposium (May 30, 2010) Circuits and Systems (ISCAS), pp. 257-260.

International Preliminary Report on Patentability for PCT Application No. PCT/US2017/35429, dated Dec. 4, 2018.

* cited by examiner

AUGMENTED REALITY IDENTITY VERIFICATION

CROSS-REFERENCE TO RELATED APPLICATIONS

This application claims the benefit of priority under 35 U.S.C. § 119(e) to U.S. Provisional Application No. 62/345,438, filed on Jun. 3, 2016, entitled "AUGMENTED REALITY IDENTITY VERIFICATION," the disclosure of which is hereby incorporated by reference herein in its entirety.

FIELD

The present disclosure relates to virtual reality and augmented reality imaging and visualization systems and more particularly to various authentication techniques in an augmented reality environment.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

Various embodiments of an augmented reality system for detecting linkages among objects/people in a user's environment or authenticating the objects/people are disclosed.

In one embodiment, an augmented reality (AR) system for detecting a linkage in an AR environment is disclosed. The augmented reality system comprises an outward-facing imaging system configured to image an environment of the AR system; an AR display configured to present virtual content in a three-dimensional (3D) view to a user of the AR system; and a hardware processor. The hardware processor is programmed to: obtain, with the outward-facing imaging system, an image of the environment; detect a first face and a second face in the image, wherein the first face is the face of a person in the environment and wherein the second face is a face on an identification document; recognize the first face based on first facial features associated with the first face; recognize the second face based on the second facial features; analyze the first facial features and the second facial features to detect a linkage between the person and the identification document; and instruct the AR display to present a virtual annotation indicating a result of the analysis of the first facial features and the second facial features.

In another embodiment, a method for detecting a linkage in an augmented reality environment is disclosed. The method can be performed under control of an augmented reality device comprising an outward-imaging imaging system and a hardware processor, the augmented reality device configured to display virtual content to a wearer of the augmented reality device. The method can comprise: obtaining an image of the environment; detecting a person, a first document, and a second document in the image; extracting first personal information based at least partly on an analysis of the image of the first document; accessing second personal information associated with second document; extracting third personal information of the person based at least partly on an analysis of the image of the person, wherein the first personal information, the second personal information, and the third personal information are in a same category; determining a likelihood of match among the first personal information, the second personal information, and the third personal information; and displaying a linkage of among the first document, the second document, and the person in response to a determination that the likelihood of match exceeds a threshold condition.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1:
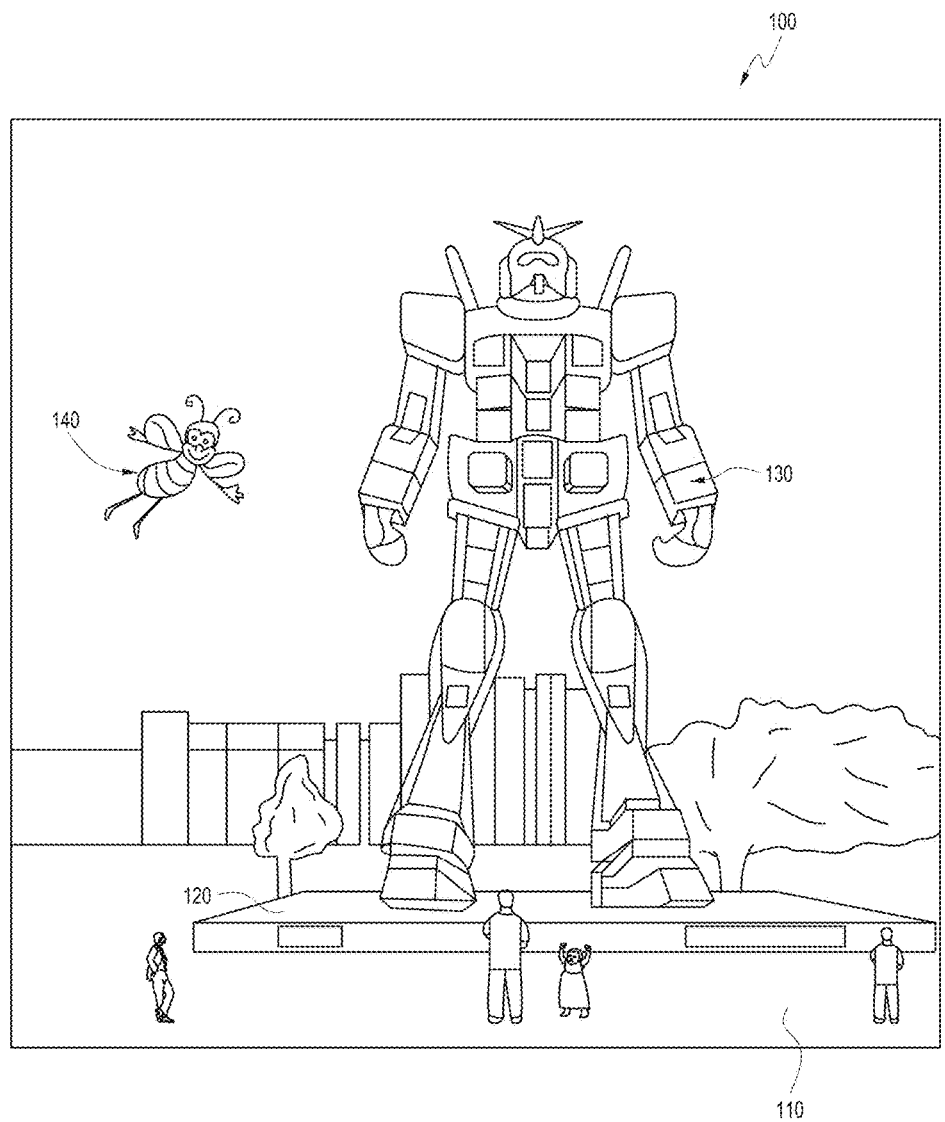
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure. Additionally, the figures in the present disclosure are for illustration purposes and are not to scale.

DETAILED DESCRIPTION

Overview

An augmented reality device (ARD) can present virtual content which can enhance a user's visual or interaction experiences with the user's physical environment. The user can perceive the virtual content in addition to the physical content seen through the ARD.

For example, at an airport security checkpoint, a traveler usually presents his or her identification document (e.g., a driver's license or passport) to an inspector who may wear the ARD. The driver's license can include identifying information such as the traveler's name, photo, age, height, etc. The traveler may also present a ticket which can include travel information such as the traveler's name, destination, carrier, etc. The inspector may view the traveler (as well as other persons in the traveler's environment) and the traveler's documents through the ARD. The ARD can image the traveler and the traveler's documents and detect linkages among the traveler's documents and the traveler (or others in the environment, such as traveling companions).

For example, the ARD can image the traveler's passport to detect a photograph of the traveler and compare it to an image of the traveler obtained by an outward-facing camera on the ARD to determine whether the passport photograph is that of the traveler. The ARD may image the traveler's ticket and determine the name on the ticket and compare it to the name on the traveler's passport. The ARD can provide a visual focus indicator showing information about the linkages found among the documents or between a document and the traveler. For example, the ARD may display a border around the passport photograph and around the traveler, and a virtual graphic showing the likelihood of a match between the traveler and the person shown in the photograph (e.g., the facial characteristics of the traveler match the photo on the passport). The inspector can use the virtual information displayed by the ARD to pass the traveler through security (in the event of a high degree of match for the linkage between the photo and the traveler) or take further action (in the event of a low degree of match for the linkage).

The ARD can additionally or alternatively determine that the traveler is the same person to whom the ticket was issued by verifying that the information on the ticket matches the information on the identify document (e.g., name or address).

Advantageously, the ARD can ameliorate the problem of degraded visual analysis and judgment in repeated tasks (e.g., repeating an identity verification task on a large number of individuals) and increase accuracy of identity verification if the identity verification were to be conducted by a human inspector (rather than by programmatic image comparison by the ARD). However, using the ARD for identity verification can also present challenges unique to the device because the ARD may not be equipped with human cognition to recognize and compare human characteristics by, for example, identifying faces and comparing facial features. Furthermore, the ARD may not know what to look for during an identity verification process because the ARD may not be able to identify the person or the document that needs to be verified. To address these challenges, the ARD may use its imaging system to obtain an image of the document and the person presenting the document. The ARD can identify information on the document (e.g., an image of the face of the person who was issued the document) and identify relevant features of the person (e.g., facial or other body features). The ARD can compare the information from the document with the features of the person and calculate a confidence level. When the confidence level is higher than a threshold, the ARD may determine that the person presenting the document is indeed the person described by the document. The ARD may also extract other identifying information for the document (e.g., age, height, gender) and compare the extracted information to the corresponding characteristic estimated from the person. The ARD may present an annotation of showing a match (or non-match) to the wearer of the ARD. For example, an image on the driver's license can be highlighted and linked to the person's face to show a match or a non-match. Additional details related to identity verification by an ARD are further described with reference to FIGS. 12A-15.

As another example of providing an enhanced user experience with physical objects in the user's environment, the ARD can identify linkages of physical objects in the user's environment. Continuing with the example in the preceding paragraph, a traveler may present multiple documents to an inspector. For example, an airline passenger may present a driver's license (or passport) as well as an airline ticket. The ARD can analyze linkages of such multiple documents by obtaining an image of the documents. The ARD can compare the information extracted from one document with information extracted from another document to determine whether the information in the two documents is consistent. For example, the ARD can extract a name from a driver's license and compare it to a name extracted from the airline ticket to determine whether the airline ticket and the driver's license likely were issued to the same person. As described above, the ARD can identify a facial match of an image from the driver's license to an image of the person to determine that the person, the driver's license, and the airline ticket are associated with each other. In some embodiments, the ARD may extract information from one of the documents (e.g., a bar code) and retrieve additional information from another data source. The ARD can compare the retrieved information with information extracted from the image of the document. If the information between the two documents is inconsistent, the ARD may determine either or both documents are falsified. In some embodiments, the ARD may conduct additional analyses or require a user of the ARD to manually verify the information when the information between the two documents appears to be inconsistent. On the other hand, if the ARD determines that information in both documents is consistent, the ARD may find that either document is valid or both documents are valid. Further, by matching identifying information extracted from the documents with identifying information extracted from an image of the person, the ARD can determine whether the person was likely issued one or both documents.

Although the examples are described with reference to an ARD, the systems and methods in the present disclosure are not required to be implemented by the ARD. For example, the systems and methods for identity and document verification may be part of a robotic system, security system (e.g., at a transportation hub), or other computing systems (such as an automatic travel check-in machine). Further, one or more features and processes described herein are not required to be performed by the ARD itself. For example, the process of extracting information from an image may be performed by another computing device (e.g., a remote server).

Also, the devices and techniques described herein are not limited to the illustrative context of security at a travel hub but can be applied in any context where it is desirable to extract information from documents, make comparisons among documents or persons, identify persons in the environment of the device, enhance security, etc. For example, a ticket taker at an amusement park or entertainment venue could use embodiments of the techniques and devices described herein to admit (or deny admittance) to patrons entering the park or venue. Similarly, a guard at a secure facility (e.g., a private laboratory or warehouse, an office building, a prison, etc.) or a police officer could use the ARD to image a person and an identification document. In yet other applications, a person viewing a number of documents through the ARD (e.g., an accountant viewing invoices, receipts, and account ledgers) can use the ability of the ARD to identify or highlight information that may exist on the documents being viewed (e.g., the accountant's ARD can highlight documents that include a particular person's name or expense so that the accountant can more readily reconcile a receipt to an invoice, etc.) to expedite tasks.

Examples of 3D Display of a Wearable System

A wearable system (also referred to herein as an augmented reality (AR) system) can be configured to present 2D or 3D virtual images to a user. The images may be still images, frames of a video, or a video, in combination or the like. The wearable system can include a wearable device that can present a VR, AR, or MR environment, alone or in combination, for user interaction. The wearable device can be a head-mounted device (HMD) which is used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
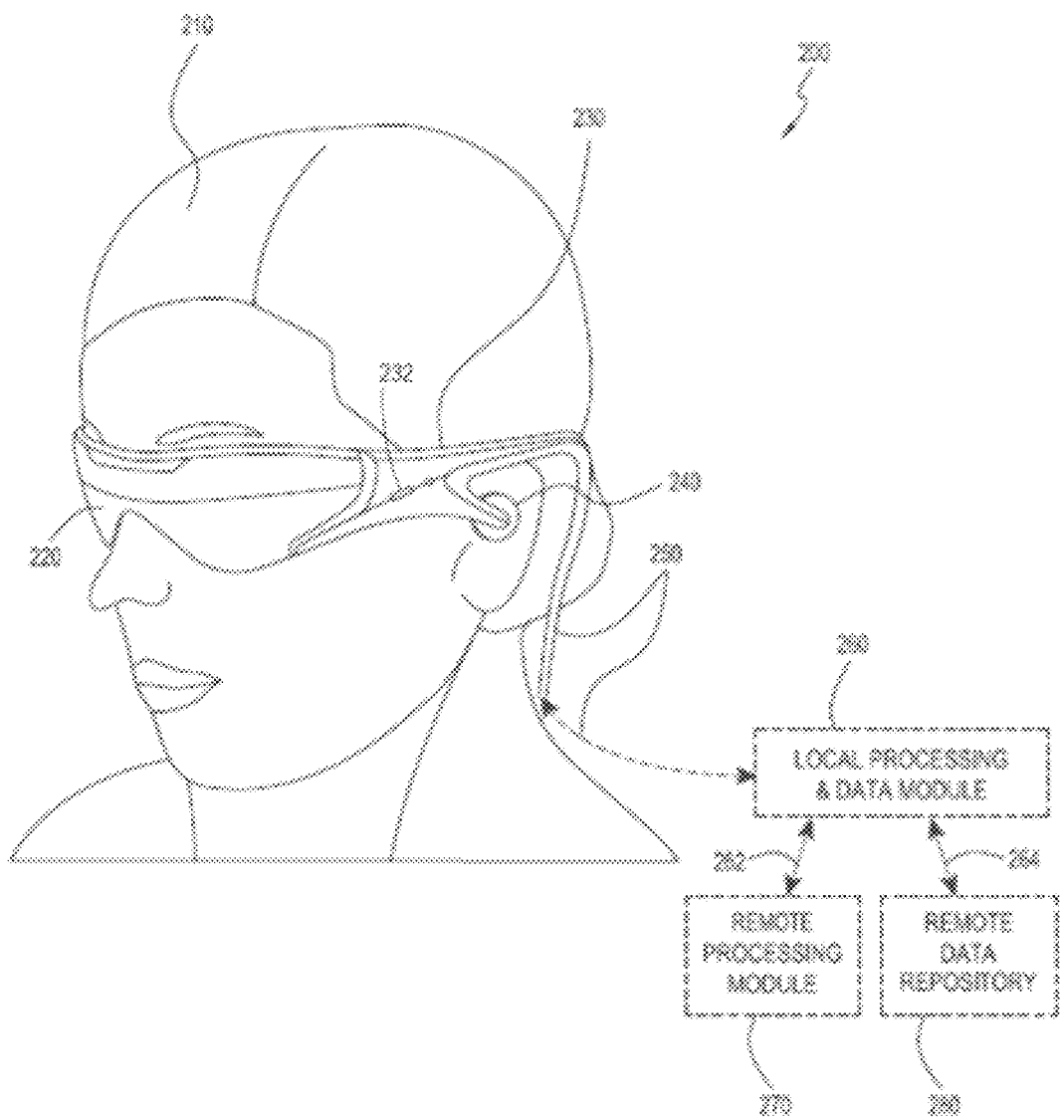
FIG. 2 schematically illustrates an example of a wearable system.

FIG. 2 illustrates an example of wearable system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display that is worn on the head of the user. In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor 232 (e.g., a microphone) for detecting an audio stream from the environment on which to perform voice recognition.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210.

As an example, the wearable system 200 can use the outward-facing imaging system 464 or the inward-facing imaging system 462 to acquire images of a pose of the user. The images may be still images, frames of a video, or a video, in combination or the like.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors 232 (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
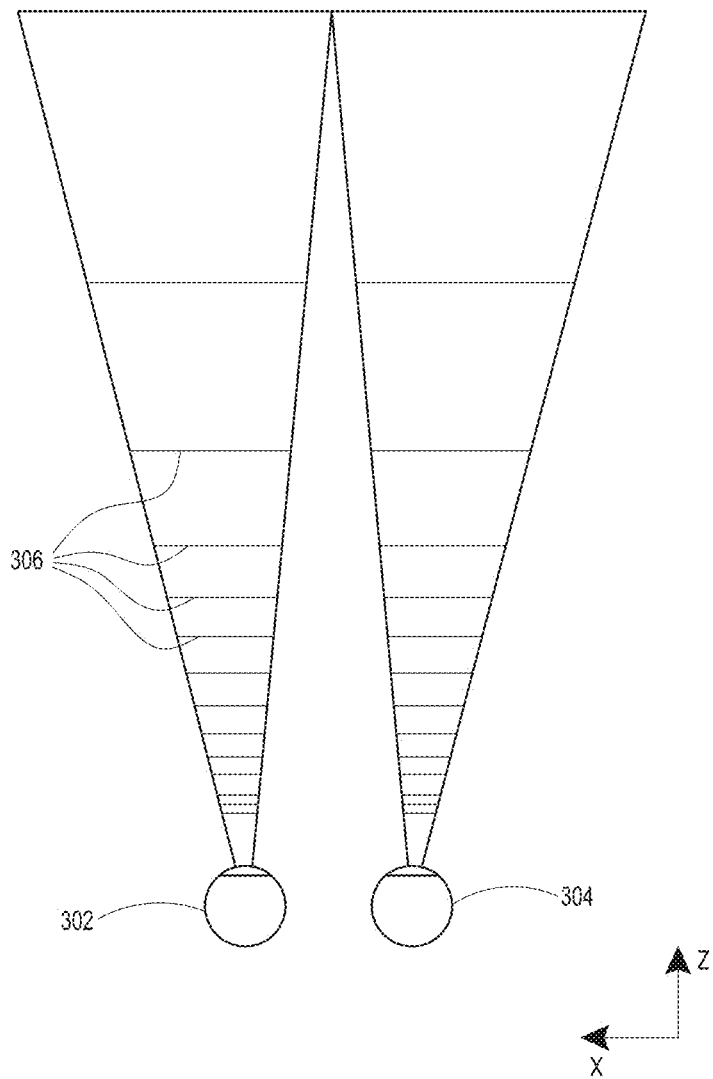
FIG. 3 schematically illustrates aspects of an approach for simulating three-dimensional imagery using multiple depth planes.

FIG. 3 illustrates aspects of an approach for simulating a three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, which has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
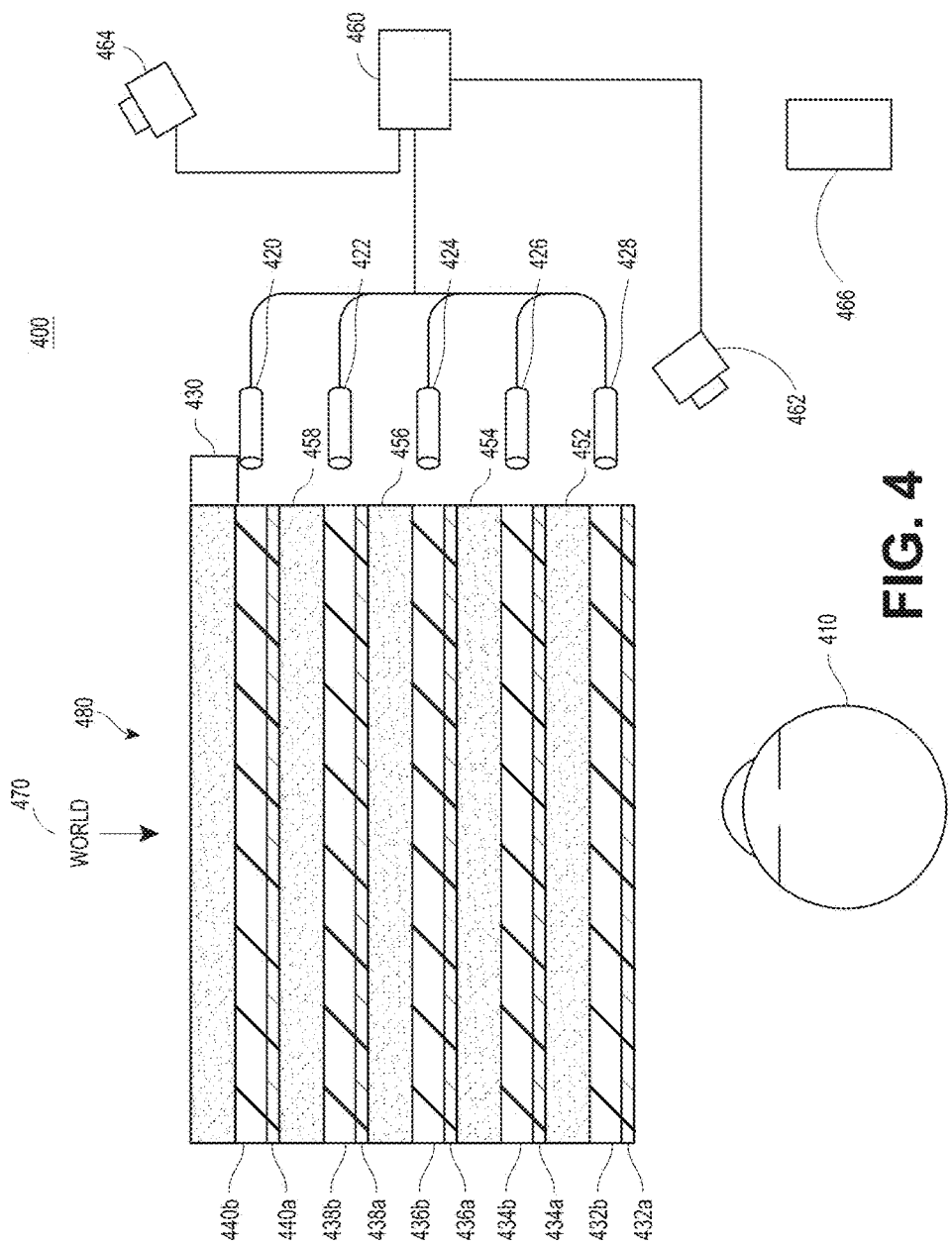
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432*b*, 434*b*, 436*b*, 438*b*, 4400*b*. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432*b*, 434*b*, 436*b*, 438*b*, 440*b* or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440*b*, 438*b*, 436*b*, 434*b*, 432*b*, each of which may be configured to distribute incoming light across each respective waveguide, for output toward the eye 410. Light exits an output surface of the image injection devices 420, 422, 424, 426, 428 and is injected into a corresponding input edge of the waveguides 440*b*, 438*b*, 436*b*, 434*b*, 432*b*. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440*b*, 438*b*, 436*b*, 434*b*, 432*b*, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440*b*, 438*b*, 436*b*, 434*b*, 432*b*. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440*b*, 438*b*, 436*b*, 434*b*, 432*b* may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The entire region available for viewing or imaging by a viewer may be referred to as the field of regard (FOR). The FOR may include 4π steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
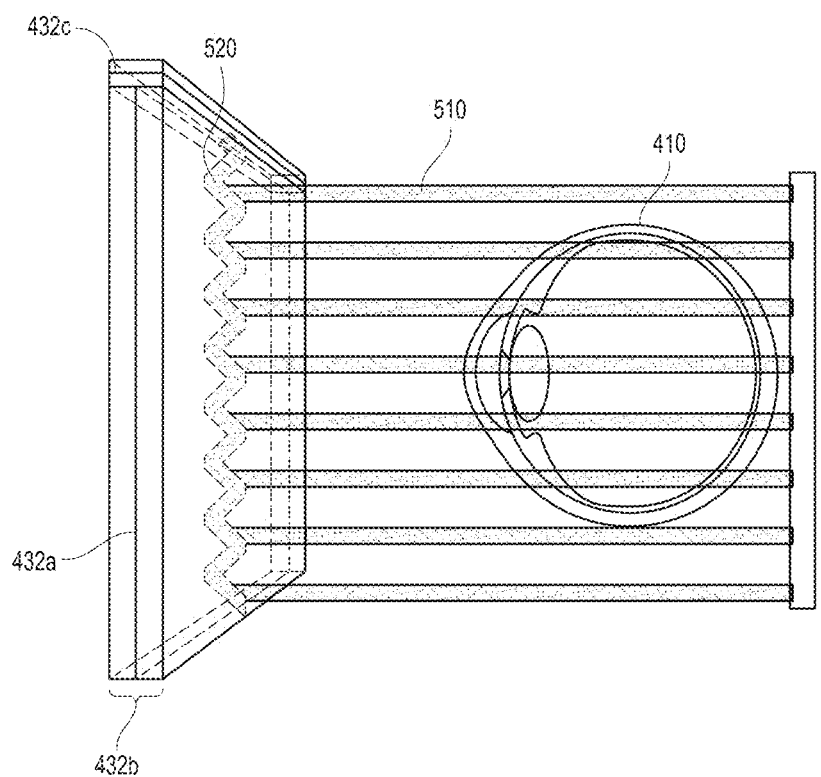
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432b. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
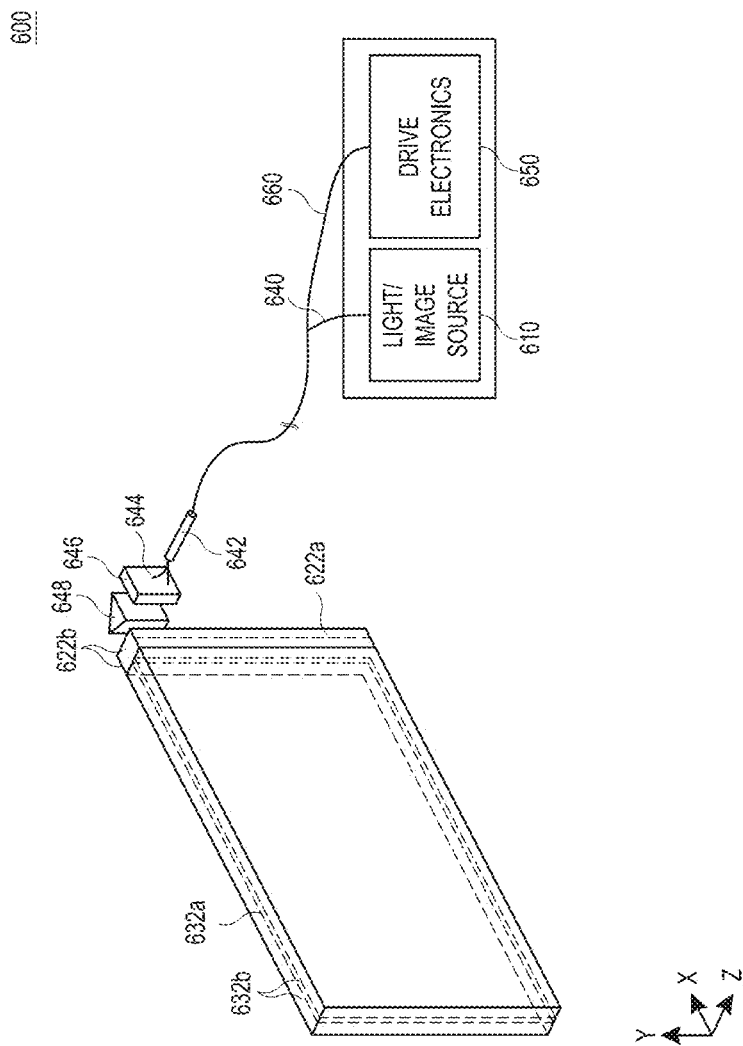
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus may, for example, include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar to or identical in at least some respects to the DOE 632a. For example, the distribution planar waveguide 622b or DOE 622a may be comprised of the same materials as the primary planar waveguide 632b or DOE 632a, respectively. Embodiments of the optical display system 600 shown in FIG. 6 can be integrated into the wearable system 200 shown in FIG. 2.

The relayed and exit-pupil expanded light may be optically coupled from the distribution waveguide apparatus into the one or more primary planar waveguides 632b. The primary planar waveguide 632b can relay light along a second axis, preferably orthogonal to first axis (e.g., horizontal or X-axis in view of FIG. 6). Notably, the second axis can be a non-orthogonal axis to the first axis. The primary planar waveguide 632b expands the light's effective exit pupil along that second axis (e.g., X-axis). For example, the distribution planar waveguide 622b can relay and expand light along the vertical or Y-axis, and pass that light to the primary planar waveguide 632b which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622b which contains the at least one diffractive optical element (DOE) 622a. The collimated light can propagate vertically (relative to the view of FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple outcoupled sets, the exit pupil of the light can be expanded vertically by the DOE 622a in the distribution planar waveguide 622b. This vertically expanded light coupled out of distribution planar waveguide 622b can enter the edge of the primary planar waveguide 632b.

Light entering primary waveguide 632b can propagate horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
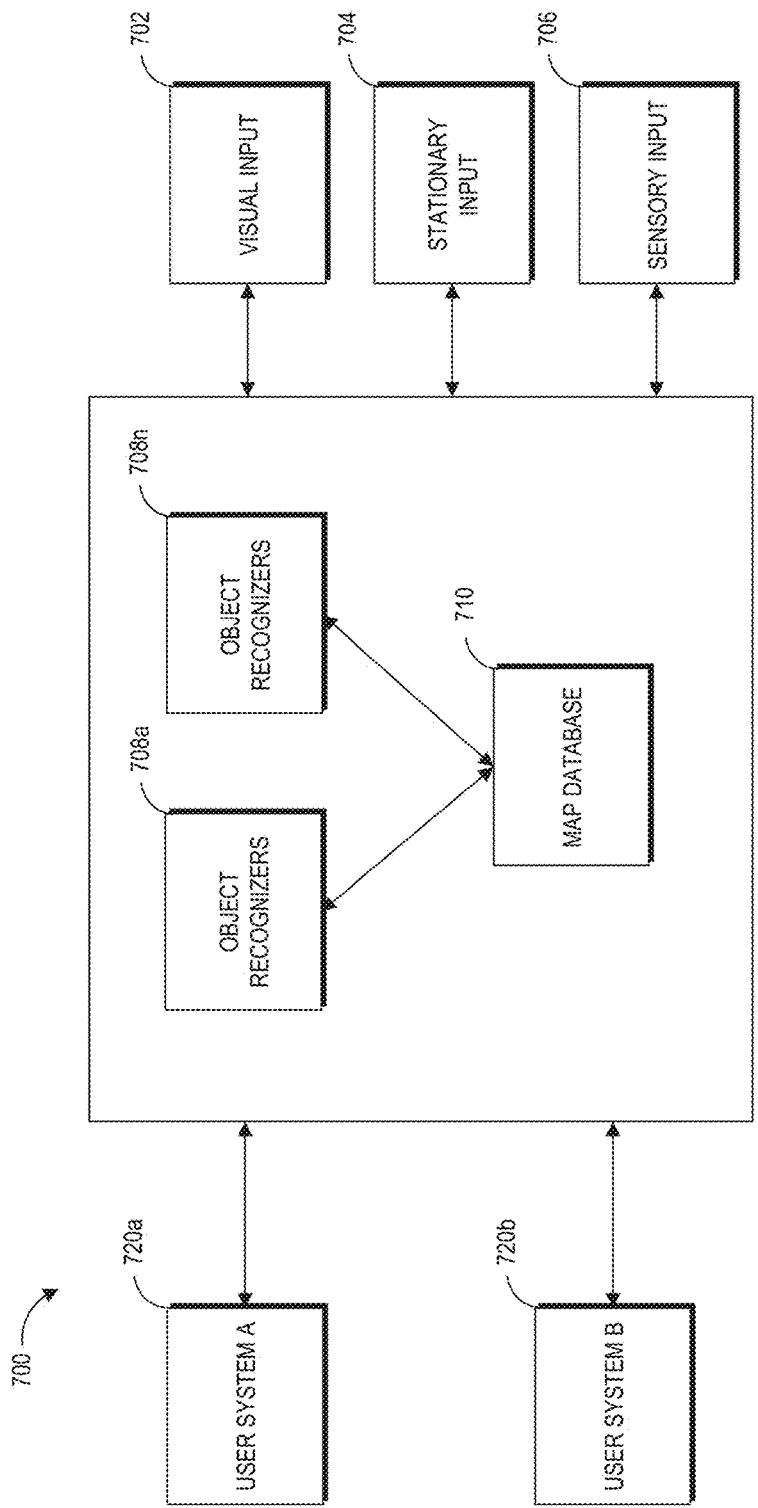
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms.

Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
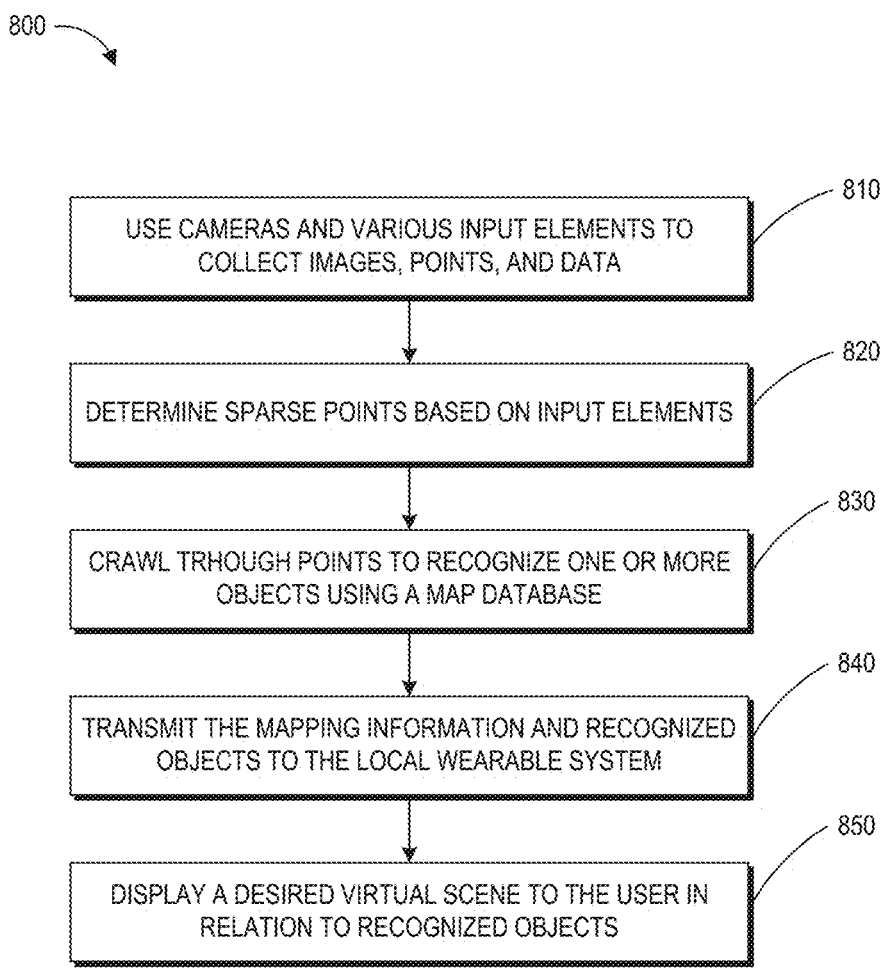
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
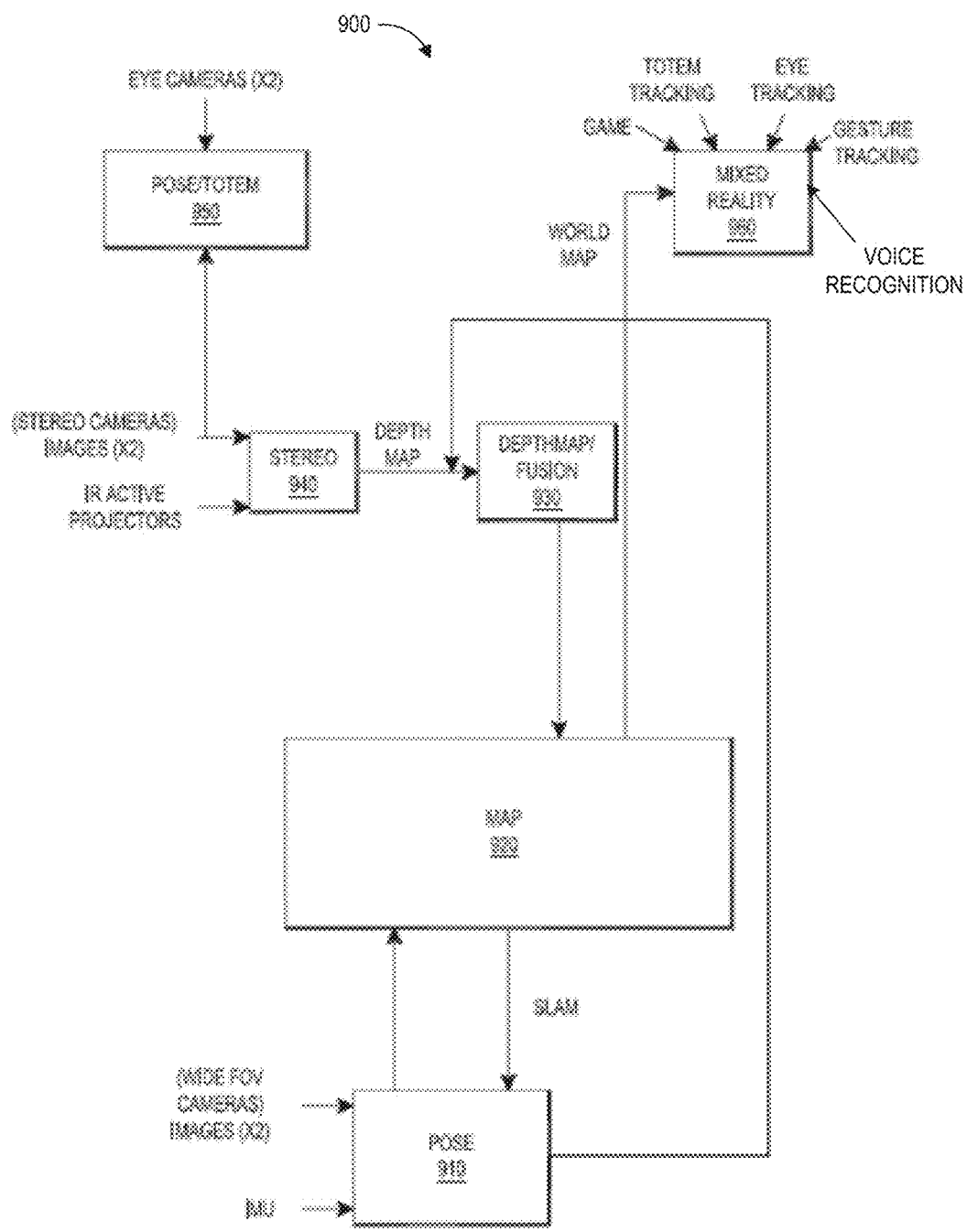
FIG. 9 is a block diagram of another example of a wearable system.

FIG. 9 is a block diagram of another example of a wearable system. In this example, the wearable system 900 comprises a map, which may include map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors) may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose 950 may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding where such objects are relative to each other, to be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Voice recognition can be another input, which can be used alone or in combination with other inputs (e.g., totem tracking, eye tracking, gesture tracking, etc.). The system 900 can include an audio sensor 232 (e.g., a microphone) that receives an audio stream from the environment. The received audio stream can be processed (e.g., by processing modules 260, 270 or central server 1650) to recognize a user's voice (from other voices or background audio), to extract commands, parameters, etc. from the audio stream. For example, the system 900 may identify from an audio stream that the phrase "show me your identification" was said, identify that this phrase was said by the wearer of the system 900 (e.g., a security inspector rather than another person in the inspector's environment), and extract from the phrase and the context of the situation (e.g., a security checkpoint) that there is an executable command to be performed (e.g., computer vision analysis of something in the wearer's FOV) and an object for which the command is to be performed on ("your identification"). The system 900 can incorporate speaker recognition technology to determine who is speaking (e.g., whether the speech is from the wearer of the ARD or another person or voice (e.g., a recorded voice transmitted by a loudspeaker in the environment)) as well as speech recognition technology to determine what is being said. Voice recognition techniques can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras and the pair of cameras for the stereo process 940 may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
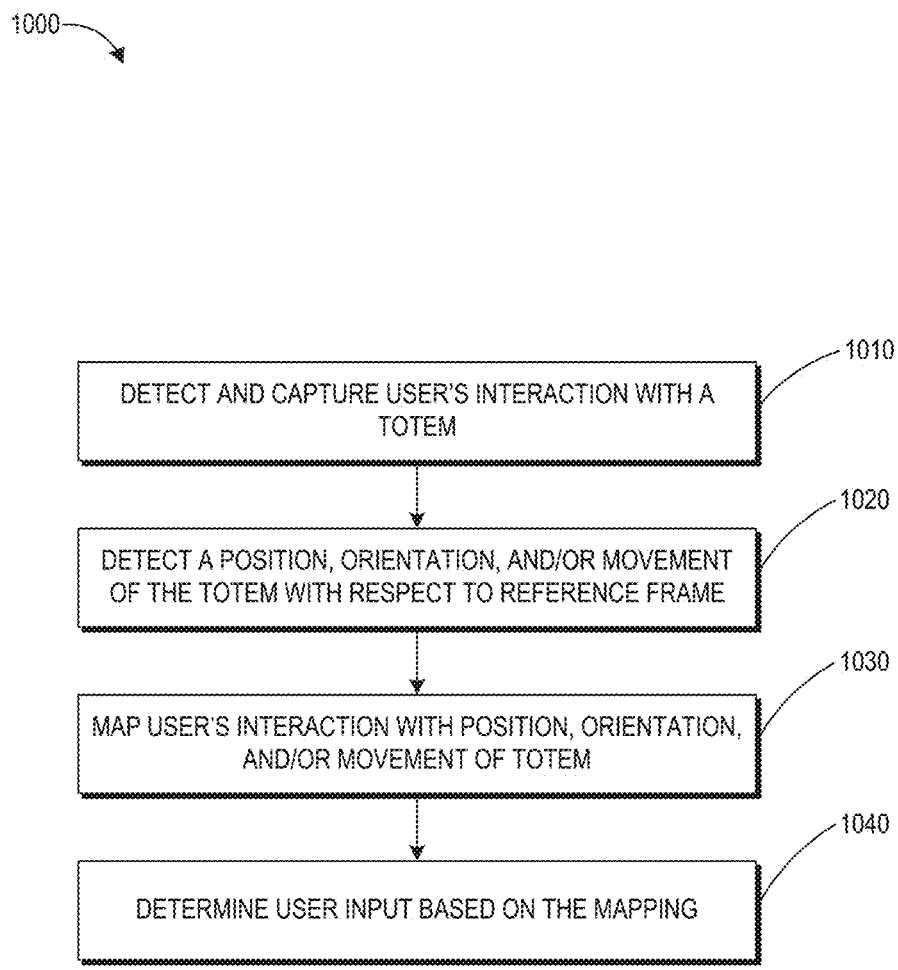
FIG. 10 is a process flow diagram of an example of a method for determining user input to a wearable system.

FIG. 10 is a process flow diagram of an example of a method 1000 for determining user input to a wearable system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the outward-facing imaging system or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. In some implementations, the vergence of the user's eyes can be tracked and an accommodation/vergence model can be used to determine the accommodation state of the user's eyes, which provides information on a depth plane on which the user is focusing. In some implementations, the wearable system can use ray casting techniques to determine which real or virtual objects are along the direction of the user's head pose or eye pose. In various implementations, the ray casting techniques can include casting thin, pencil rays with substantially little transverse width or casting rays with substantial transverse width (e.g., cones or frustums).

The user interface may be projected by the display system as described herein (such as the display 220 in FIG. 2). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 462 or the outward-facing imaging system 464).

Figure 11:
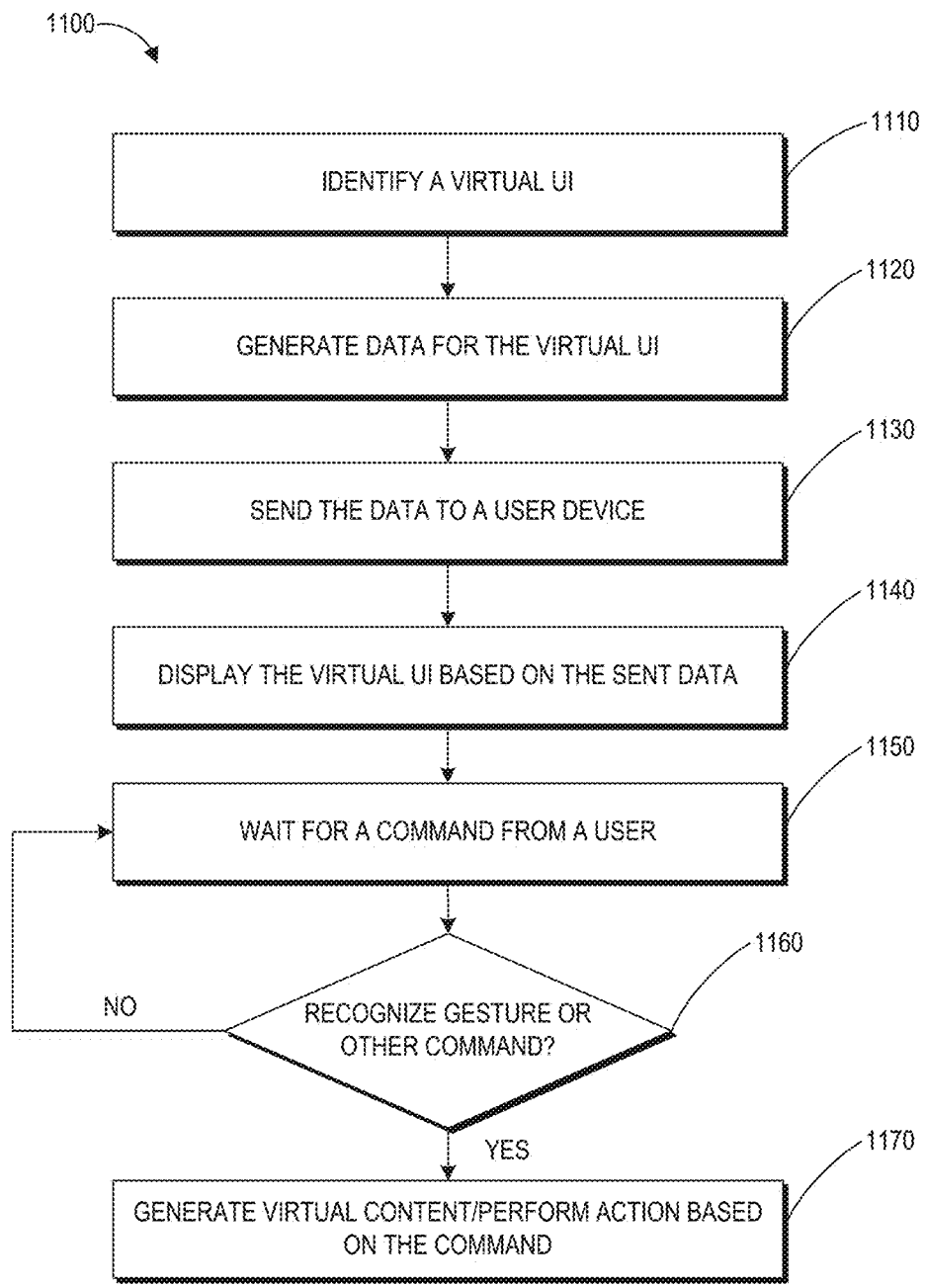
FIG. 11 is a process flow diagram of an example of a method for interacting with a virtual user interface.

FIG. 11 is a process flow diagram of an example of a method 1100 for interacting with a virtual user interface. The method 1100 may be performed by the wearable system described herein. Embodiments of the method 1100 can be used by the wearable system to detect persons or documents in the FOV of the wearable system.

At block 1110, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 1120, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 1130, the wearable system may send the data to the display from the cloud or the data may be sent from a local database to the display components. At block 1140, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1150. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 1160), virtual content associated with the command may be displayed to the user (block 1170).

Additional examples of wearable systems, UIs, and user experiences (UX) are described in U.S. Patent Publication No. 2015/0016777, which is incorporated by reference herein in its entirety.

Identity Verification Based on an Image of the Person

As described with reference to FIG. 4, an ARD can use an outward-facing imaging system 464 to image the environment around the wearer. The images can include still images, individual frames from a video, or a video. The ARD can analyze the images to identify linkages among objects (e.g., documents) and persons, elements within objects (e.g., a photograph on a passport, a face in an image of a traveler's body, etc.).

Figure 12A:
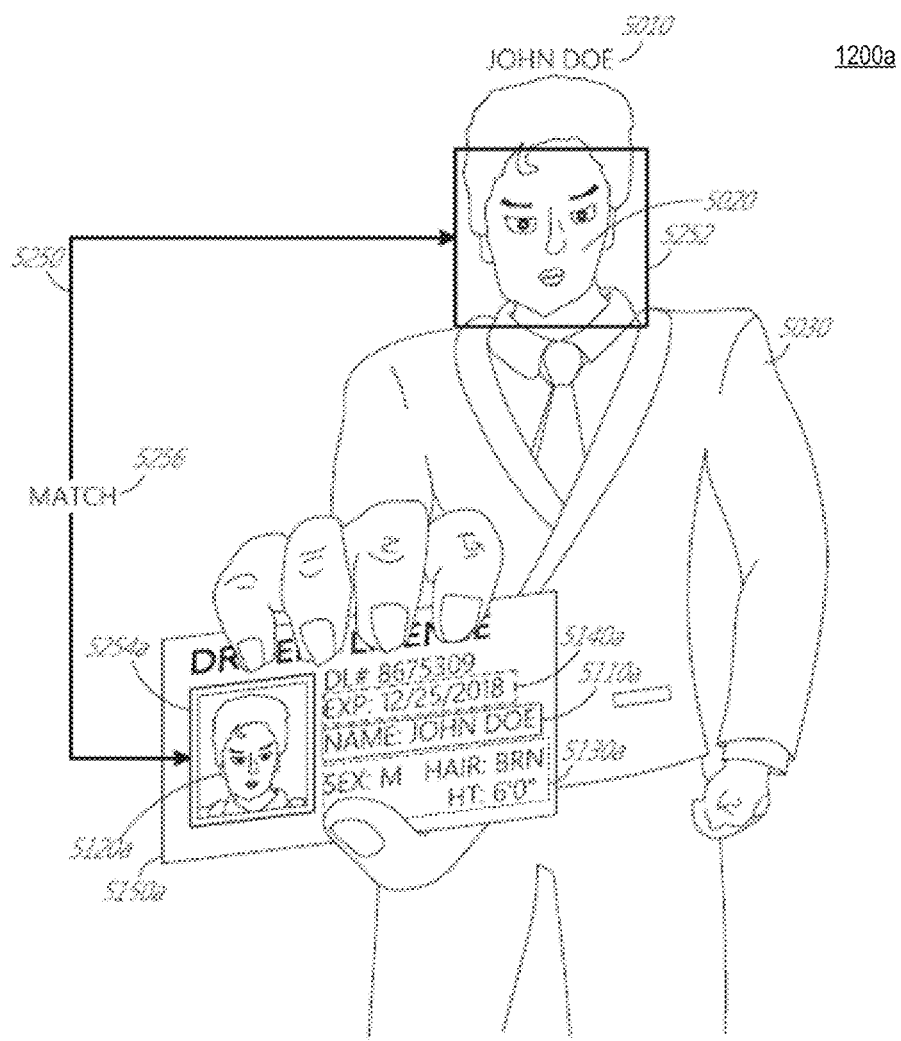
FIG. 12A illustrates an example of identity verification by analyzing linkages between a person and a document.

FIG. 12A illustrates an example of identity verification by analyzing characteristics of a person and information in a document. In FIG. 12A, a person 5030 is holding a driver's license 5150*a*. The person 5030 may stand in front of an ARD, which for example may be worn by a security inspector at a checkpoint. The ARD can capture an image 1200*a* which includes a portion of the person 5030's body and the driver's license 5150*a*. The ARD can extract biometric information of the person from the image 1200*a* and determine the person's identity using the extracted biometric information.

As an example, the ARD may use facial recognition techniques to determine the identity of the person 5030. The ARD can analyze the image 1200*a* and locate faces appearing in the image. As shown in FIG. 12A, the ARD can detect the face 5020 of the person 5030 and the face 5120*a* on the driver's license 5150*a* using a variety of face detection techniques, such as wavelet-based cascade algorithms (e.g., a Haar wavelet-based boosted cascade algorithm), deep neural networks (DNN) (e.g., a triplet embedding network trained to identify faces), etc.

Once a face is detected, the ARD can characterize the face by calculating a feature vector for the face. The feature vector can be a numerical representation of the face. For example, ARD may calculate the feature vector based on facial features (such as, e.g., corners of the eyes, eyebrows, mouth, the tip of the nose, etc.) of the detected face. A variety of algorithms such as, e.g., facial landmark detection, template matching, DNN triple network, other embedded networks, in combination or the like, may be used to characterize the face.

Feature vectors of the two faces within the image 1200*a* may be used to compare similarities and dissimilarities between the two faces. For example, the ARD can calculate the distance (such as a Euclidean distance) between the two feature vectors in a corresponding feature vector space. When the distance exceeds a threshold, the ARD may determine the two faces are sufficiently dissimilar. On the other hand, when the distance is below the threshold, the ARD may determine the two faces are similar.

In some embodiments, different weights may be associated with different facial features. For example, the ARD can assign weights to components of the feature vector based on the location of the facial features. As a result, the weight associated with respective facial features may be incorporated in determining similarities and dissimilarities of the two faces.

In some situations, the image of the environment may include multiple faces. For example, at an airport security checkpoint, the image acquired by the ARD may include a person standing in front of the ARD as well as other people in the surroundings. The ARD may use a filter to identify one or more relevant faces. As an example, the ARD may determine the relevant face based on a distance or a size of the face relative to the location of the ARD. The ARD may determine that the closest or the biggest face in the image is the relevant face because it is likely that the person closest to the ARD is the one being verified.

As another example, the ARD may identify a face on a document (among the multiple faces in the environment) and match the face on the document with a human in the environment using the techniques described herein. The ARD can distinguish a face on a document from a physical face of a person by tracking keypoints associated with the faces (the physical face and the face on the document). The ARD may use any keypoints algorithms (such as Shi-Tomasi corner detection algorithm) to implement this process. In certain implementations, the face detection, facial recognitions, and keypoints tracking may be performed by one or more object recognizers 708 as described in FIG. 7.

The ARD can track the motions of the extracted keypoints to determine whether the face is a physical face or an image of a face on a document. For example, the ARD can track the motions of the extracted keypoints using sequential frames of the image acquired by the outward-facing imaging system 464. The ARD may tag a face as a physical face when it detects more movements of the features. This is because features of the physical face usually have more movements than the features of the face on the document. For example, a person blinks his or her eyes every few seconds while the eyes as shown on the document do not blink. Additionally or alternatively, the ARD may tag a face as an image on the document when the movement of the face can be described by a single planar homography (e.g., a computer vision relation between two or more images of the same planar surface). This is because the facial image on the document usually moves together with the document while the face of a person typically does not move with together with the environment (or objects/other people in the environment).

In addition or in alternative to facial recognition, the ARD may use other biometrics (such as height, hair color, eye color, iris code, voice print, etc.) to identify a person. For example, the ARD can determine the person 5030's hair color based on the 1200a image acquired by the outward-facing imaging system 464. The ARD can also estimate the person 5030's personal information such as age, sex, height based on the image acquired by the outward-facing imaging system 464. For example, the ARD may be able to calculate the person 5030's height based on the image of the person and the distance between the person 5030's location and location of the ARD. The ARD may also estimate the person's age based on his facial features (such as, e.g., wrinkles). The ARD may use DNN or other similar algorithms to achieve this purpose. As yet another example, the ARD can use an individual's voice print alone or in combination with facial recognition (or other biometrics) to determine the person's identity. The ARD can acquire a person's voice data as the person speaks and apply the voice recognition algorithms described in FIG. 9 to identify features (e.g, pitches, dialects, accent, etc.) in the person's voice. The ARD can further look up the identified features in a database to determine whether there are one or more persons matching the identified features.

The ARD can use information acquired from the image 1200a to obtain additional information not available in the image 1200a. For example, The ARD can calculate the person 5030's iris code using the image of the person 5030's eyes. The ARD can look up the person 5030's iris code in a database and obtain the name of the person 5030. Additionally or alternatively, the ARD can use the person's height, hair color, eye color, facial features to obtain additional personal information (such as name, address, occupation, etc.) by referencing to a database. For example, the ARD can use the person's height, hair color, and eye color to perform a database query and receive a list of persons having the matching characteristics of the queried height, hair color, and eye color.

Document Authentication Based on an Image of the Document

As shown in FIG. 12A, the driver's license 5150a may include a variety of personal information. The information may be explicit (directly perceivable by a person when the document having the information is illuminated with light within the human visible spectrum or HVS). The HVS generally has a wavelength range of about 400 nm to about 750 nm. Explicit information on driver's license 5150a can include the driver's license number, expiration date 5140a, name 5110a, sex, hair color, height, and an image of a face 5120a. For example, the ARD can extract expiration date 5140a from the image of the driver's license 5150a and compare the expiration date 5140a with today's date. If the expiration date 5140a is before today's date, the ARD may determine that the document is no longer valid.

Figure 12B:
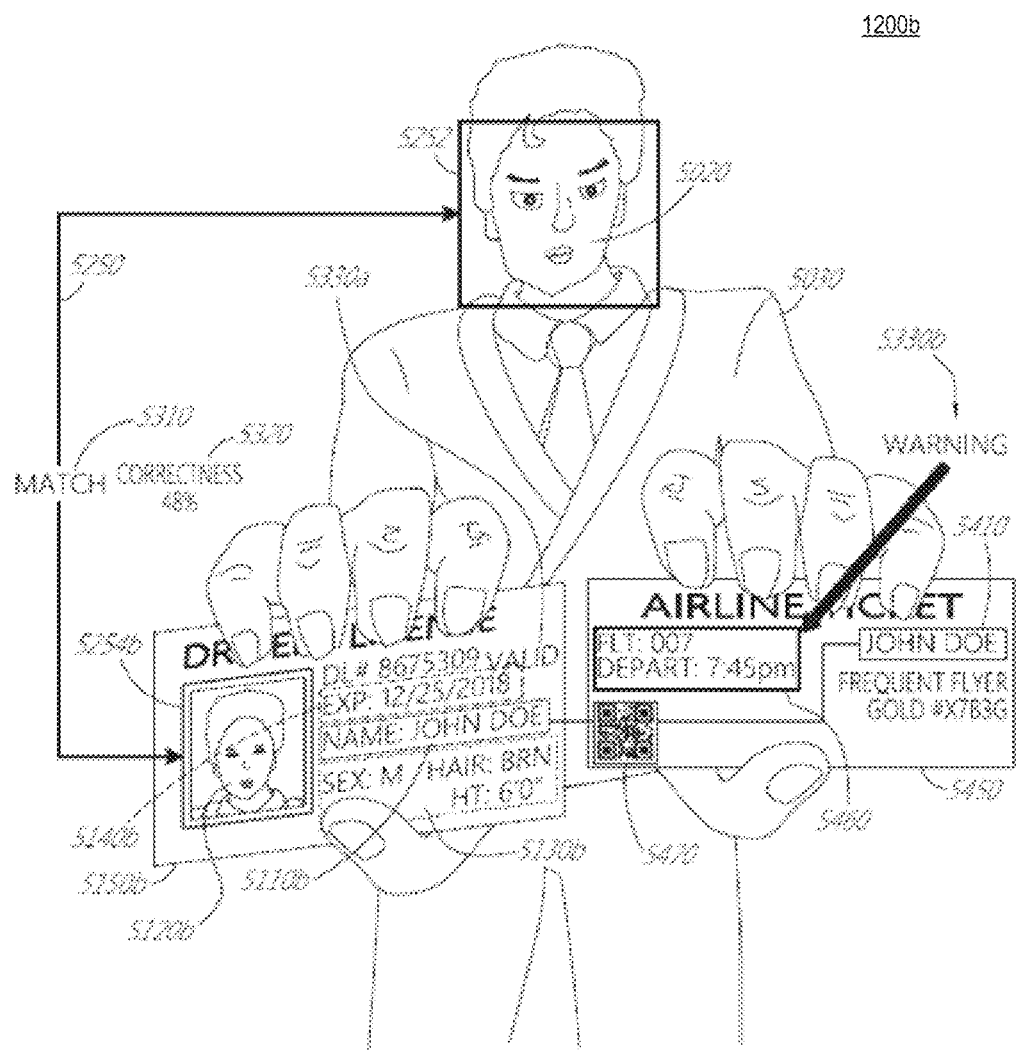
FIG. 12B illustrates an example of identity verification by analyzing linkages between two documents.

A document may also include hidden information (not directly perceivable by a person when the document is illuminated with light within the human visible spectrum). Hidden information may be encoded in a label or may contain a reference to another data source (such as an identifier that can be used to query a database to retrieve additional information associated with the document). For example, as shown in FIG. 12B, the document (e.g. airline ticket 5470) may include an optical label such as a quick response (QR) code 5470 or a bar code. Although the QR code 5470 is directly perceivable by human eyes, the information encoded in the QR code cannot be directly deciphered by human. The ARD can include optical sensors that can extract such hidden information from the document. For example, the ARD can scan the QR code and communicate with another data source (such as airline's reservation system) to obtain information encoded in the QR code. Labels may also include biometric labels, such as iris code, fingerprints, etc. For example, a passport may include a person's iris code. The ARD may obtain an image of the passport including the iris code. The ARD can look up a database using the iris code to obtain other biometric information (e.g., date of birth, name, etc.) of the person.

In some situations, the hidden information may only be perceivable under certain optical conditions outside the HVS such as, e.g., ultraviolet (UV) light or infrared (IR) light. The ARD may include optical sensors that can emit light outside of a human visible spectrum (e.g., UV light or IR light). For example, to protect privacy of a person, the iris code in a passport may only be seen under UV light. The ARD may obtain the iris code by emitting the UV light and obtain an image of the document under the UV condition. The ARD can then extract iris code using the image obtained under the UV condition. In other cases, for security reasons, an identification document may include two copies of a photograph of the person: the first copy viewable with visible light (within the HVS) and the second copy viewable only when illuminated with light outside the HVS (e.g., under UV or IR illumination). Such double copies can increase security, because a person might be able to modify the copy that is visually viewable but might not have the ability to make the same changes to the copy that is viewable only under UV or IR illumination. Accordingly, the ARD might illuminate the document with non-HVS light and obtain an image of the non-HVS-viewable copy, obtain an image of the HVS-viewable copy, obtain an image of the actual person, and make a comparison (e.g., using facial recognition techniques) using all three images.

In addition or in alternative to optical label or biometric label, the document may also have an electromagnetic label, such as an RFID tag. The electromagnetic label can emit signals that can be detected by the ARD. For example, the ARD may be configured to be able to detect signals with certain frequencies. In some implementations, the ARD can send a signal to an object and receive feedback of the signal. For example, the ARD may send a signal to ping the label on the airline ticket 5470 (shown in FIG. 13).

The ARD can determine the authenticity of the document based on information (explicit or hidden) in the document. The ARD may perform such verification by communicating with another data source and looking up information acquired from the image of the document in that data source. For example, where the document shows an individual's street address, the ARD may look up the street address in a database and determine whether the street address exists. If the ARD determines that the street address does not exist, the ARD may flag to the wearer that the document may be falsified. On the other hand, if the street address exists, the ARD may determine that the street address may have a higher likelihood to be the person's true address. In another example, the document may include an image of a person's fingerprint. The ARD can use the outward-facing imaging system 464 to obtain an image of the document including the image of the fingerprint and retrieve, from a database, personal information (such as the person's name, address, birthday, etc.) associated with this fingerprint. The ARD can compare the personal information retrieved from the database with the information appearing on the document. The ARD may flag the document as falsified if these two pieces of information do not match (e.g., the retrieved information has a different name than the one appeared on the document). On the other hand, the ARD may flag the document as authentic if these two pieces of information match.

The ARD can also verify a document using only the information in the document. For example, the ARD may receive a signal from a label associated with the document. If the signal is in a particular frequency band, the ARD may determine that the document is authentic. In another example, the ARD may actively send query signals to objects surrounding the ARD. If the ARD can successfully ping a label associated with a document, the ARD may determine that the document is authentic. On the other hand, if there is a mismatch between the image of the document and the signal received by the ARD, the ARD may determine that the document is falsified. For example, the image of a document may include an image of an RFID but the ARD may not receive any information from the RFID. As a result, the ARD may determine that the document is falsified.

Although the examples described herein refer to authentication of a document, these examples are not limiting. The techniques described herein can also be used to authenticate any object. For example, the ARD may obtain an image of the address of a package and determine whether the package may be dangerous by analyzing the sender's or the receiver's address.

Linkage Between a Person and a Document

As shown in FIG. 12A, the ARD can verify whether the person standing in front of the wearer is the same person shown on the driver's license. The ARD may perform such verification by identifying matches between the person 5030 and the driver's license 5150a using a variety of factors. The factors may be based on information extracted from the image 1200a. For example, one factor may be the degree of similarities between the face 5020 of the person 5030 and the face 5120a shown on the driver's license 5150a. The ARD can use facial recognition techniques described herein to identify faces and calculate distances among facial features. The distances may be used to express the similarity or dissimilarity of the two faces. For example, when the two faces have similar distances between two eyes and similar distances from nose to mouth, the ARD may determine that the two faces are likely to be the same. However, when the distances among certain facial features vary between two faces, the ARD may determine that the two faces are unlikely to be the same. Other techniques of comparing faces may also be used. For example, the ARD can determine whether these two faces fall within the same template.

In some embodiments, the ARD may restrict facial recognition to include at least one face appearing on the paper. This is to avoid comparing facial features of two persons while the wearer of the ARD is only interested in verifying the identity of a person against a document. Any techniques described herein for disambiguating the face on the document from the face on the human may be used for this purpose.

As another example, the factor for verifying the linkage between a person and a document may include matching hair colors. The ARD can obtain the hair color of the person 5030 from the image 1200a. The ARD can compare this information with the hair color described on the driver's license 5150. In the section 5130a of the driver license 5150a, John Doe's hair color is brown. If the ARD determines that the hair color of the person 5030 is also brown, then the ARD may determine a match exists for the fair color.

The factors may also be based on information obtained from a data source other than the images (e.g., image 1200a and image 1200b) acquired by the ARD. The ARD can use the information extracted from the image 1200a to obtain more information associated with the person or the document from another data source. For example, the ARD may generate an iris code for the person 5030 and look up the iris code in a database to obtain the name of the person 5030. The ARD can compare the name found in the database with the name 5110a appearing on the driver's license 5150a. If the ARD determines that these two names match, the ARD may determine that the person 5030 is indeed John Doe.

The ARD may process the person's facial image or the facial image on the driver's license when making the comparison. For example, the person 5030 may be wearing glasses while the photo 5254a on the driver's license doesn't have glasses. The ARD can add a pair of glasses (like the glass the person 5030 is wearing) to the photo 5254a or "remove" the pair of glasses the person 5030 is wearing and detect matches using the processed images. The ARD may also process other portions of the acquired images (e.g. image 5200a or image 5200b), such as changing the clothes the person 5030 is wearing, while searching for matches.

In certain embodiments, the ARD may calculate a confidence score to determine whether the person is the same one as described by the document. The confidence score may be calculated using matches (or mismatches) of one or more factors between the person and the document. For example, the ARD may calculate the confidence score based on matching hair color, pictures of the face, and gender. If the ARD determines all three characteristics match, the ARD may determine that the person is the one shown by the document with 99% confidence.

The ARD may assign different weights to different factors. For example, the ARD may assign a heavy weight to matching iris code while a light weight to matching hair color because it is difficult to forge a person's the iris code. Therefore, when the ARD detects that the person's iris code matches the one in the document, the ARD may flag that the person is the one described in the document even though the person's hair color might not match the description in the same document.

Another example of confidence score is shown in FIG. 12B. In FIG. 12B, the ARD can calculate a degree of similarities between a person's face 5020 and the person's image 5120 on the driver's license 5150b. However, the face 5020 has different features than the face in the image 5120b. For example, the image 5120b has different eyebrows. The eyes in image 5120b are also smaller and more spaced apart than those of the face 5020. Using facial recognition algorithms and methods of calculating confidence score, the ARD may determine that there is only a 48% chance that the face 5020 of the person 5030 matches the face 5120b on the driver's license.

Besides using confidence score to verify a person's identity, the confidence score may be used to verify the validity of a document or verify linkages across multiple documents. For example, the ARD may compare information on the document with information stored in the database. The ARD can calculate a confidence score based on how many matches are found. If the confidence score is below a certain threshold, the ARD may determine that the document is invalid. On the other hand, if the confidence score is greater than or equal to the threshold, the ARD may determine that the document is valid.

Linkage Among Multiple Documents

FIG. 12B illustrates an image 1200b acquired by the ARD. In the image 1200b, an individual 5030 is holding a driver license 5150b and an airline ticket 5450. The ARD can compare information in these two documents and determine the validity of the driver's license or the airline ticket. For example, if the ARD determines that the information on the driver's license does not match the information on the airline ticket, the ARD may determine either the driver's license or the airline ticket or both as invalid.

The ARD can verify the validity of the two documents using explicit information in the image 1200b. For example, the ARD may compare the name 5110b shown on the driver's license 5150b with the name 5410 shown on the airline ticket 5450. Because these two names are both John Doe, the ARD can flag that a match exists.

The ARD can verify the validity of the two documents by referencing to another data source. In FIG. 12B, the ARD may be able to retrieve the passenger's name, date of birth, and gender by scanning the QR code 5470. The ARD can compare such information with information shown on the driver's license and determine whether the airline ticket and the driver's license belong to the same person.

Although the examples described herein are with reference to comparing two documents, it should be noted that the techniques can also be applied to comparing multiple documents or verifying identities of multiple persons. For example, the ARD may compare how similar a group of people look using facial recognition techniques described herein.

Examples of Annotations

The ARD can provide annotations to the images (e.g. images 1200a and 1200b) acquired by the ARD when verifying an individual (such as John Doe) or a document (such as driver's license 5150a). The annotations may be near the person, the document, a feature of the person, or a certain piece of information (such as expiration date) in the document.

The annotations may comprise a visual focus indicator. The visual focus indicator may be a halo, a color, a highlight, an animation, or other audible, tactile, or visual effects, in combination or the like, which can help the wearer of the ARD to more readily notice certain features of the person or the document. For example, the ARD may provide a box 5252 (shown in FIGS. 12A and 12B) around John Doe's face 5020. The ARD may also provide a box (e.g., box 5254a in FIG. 12A and box 5254b in FIG. 12B) around the facial image on the driver's license. The box may indicate the region of the face identified using facial recognition techniques. Additionally, the ARD may highlight the expiration date 5140a of the driver's license 5150a in dotted lines as shown in FIG. 12A. Similarly, the ARD may highlight the expiration date 5140b of the driver's license 5150b in FIG. 12B.

In addition or in alternative to the visual focus indicator, the ARD can use texts for annotations. For example, as shown in FIG. 12A, the ARD can display "John Doe" 5010 on top of his head once the ARD determines that the person's name is John Doe. In other implementations, the ARD may display the name "John Doe" elsewhere, such as to the right of the person face. Besides name, the ARD can also show other information near the person. For example, the ARD may display John Doe's profession on top of his head. In another example, in FIG. 12B, after authenticating the driver's license, the ARD may display the word "VALID" 5330a on top of the driver's license 5150b. Also in FIG. 12B, the ARD may determine that the flight's departure 5460 time has already passed. As a result, the ARD may connect the word "WARNING" to the departure time 5460 to highlight this piece of information to the wearer of the ARD.

The ARD can use annotations to indicate a match. For example, in FIG. 12A, if the ARD determines that the John Doe's face 5020 matches the picture shown on his driver's license 5150a, the ARD may display the word "MATCH" 5256 to the wearer of the ARD. The ARD may also display a box 5252 over John Doe's face 5020 and another box 5254a over his picture on the driver's license 5150a, where the box 5252 and box 5254a may have the same color. The ARD may also draw a line between the two matching features (e.g. John Doe's face 5020 and the image of his face 5120a on the driver's license 5150a) indicating a match detected.

In some embodiments, as shown in FIG. 12B, the ARD may display the word "MATCH" 5310 with a confidence score 5320 for the match. In some implementations, when the confidence score 5320 is below a threshold, the ARD may display the word "MISMATCH" instead of "MATCH".

In addition to automatically detecting matches, the ARD may also allow the wearer to override the judgment of the ARD. For example, when the ARD shows a low likelihood of matches or shows a mismatch, the ARD may allow the wearer to switch manual inspection which may override the result provided by the ARD.

Example Process of Matching a Person with a Document

Figure 13:
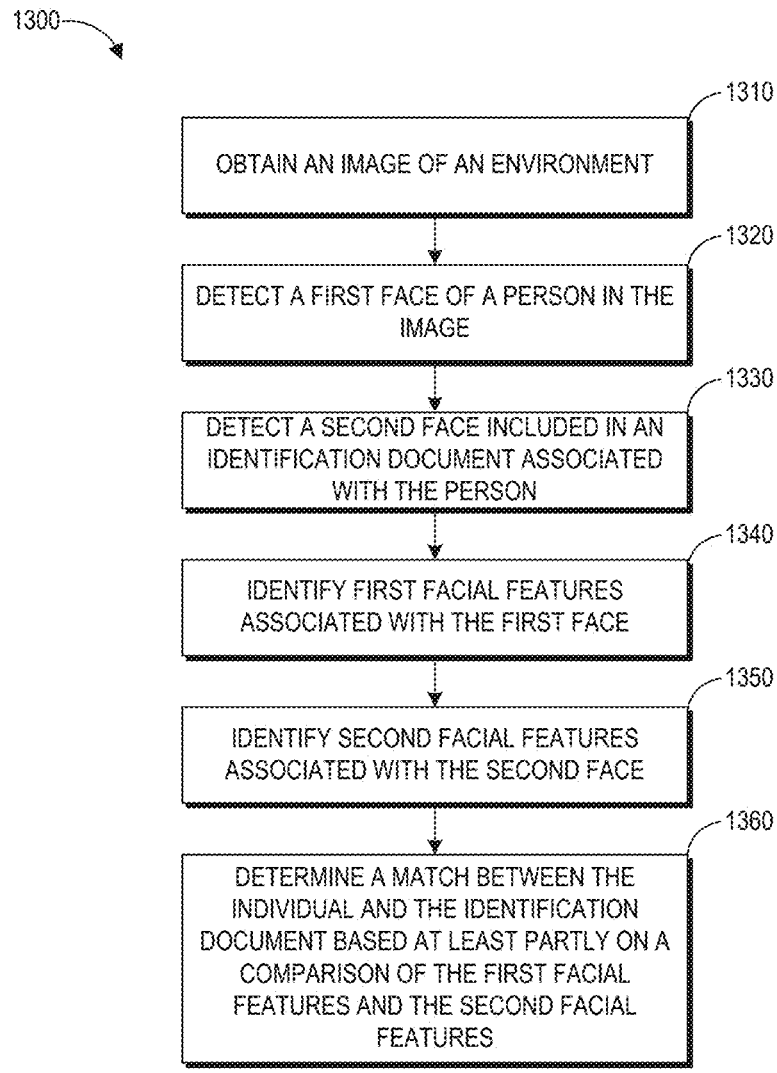
FIG. 13 is a flowchart of an example process for determining a match between a person and an identification document presented by the person.

FIG. 13 is a flowchart of an example process for determining a match between a person and an identification document presented by the person. The process 1300 may be performed by the AR system described herein (e.g., the wearable system 200), although the process 1300 may also be performed by other computing systems such as a robot, a travel check-in kiosk, or a security system.

At block 1310, the AR system can obtain an image of an environment. As described herein, the image may be still images, individual frames from a video, or a video. The AR system can obtain the image from the outward-facing imaging system 464 (shown in FIG. 4), a room camera, or a camera of another computing device (such as a webcam associated with a personal computer).

Multiple faces may exist in the image of the environment. The system can use facial recognition techniques such as a wavelet-based cascade algorithm or DNN to locate these faces. Among all of the faces in the image of the environment, some of the faces may be facial images on documents while other faces may be physical faces of different people in the environment.

At block 1320, the AR system can detect a first face among the multiple faces in the image using one or more filters. For example, as described with reference to FIG. 12A, one of the filters may be the distance between a face and the AR system which acquires the image. The system may determine that the first face may be the face that has the closest distance to the device. In another example, the AR system may be configured to only detect faces within a certain distance. The first face may be a physical face of a person whose identity is being verified by the system.

At block 1330, the AR system can detect at least a second face among all the faces in the image using similar techniques as those used for detecting the first face. For example, the system may determine that the second face may be the face that's within a certain distance from the AR system, the first face, and so on.

In some implementations, the second face may be a face on a document such as a driver's license. The AR system can detect the second face by searching within a document. The AR system can distinguish a face in the document from a physical face by tracking movements of keypoints. For example, the AR system can extract keypoints of an identified face. The AR system can track the motions of the keypoints between sequential frames of video. If the motion of a face can be described by a single planar homography, the AR system may determine that the face is a facial image on the identification document.

At block 1340, the AR system can identify facial features of the first face and characterize the first face using the facial features. The AR system can characterize the face using landmark detection, template matching, DNN triplet network, or other similar techniques. The AR system can use the same technique to identify facial features of the second face and characterize the second face at block 1350.

At block 1360, the AR system can compare the facial features of the first face and the second face. The AR system can calculate a vector for the first face and another vector for the second face, and calculate a distance between the two vectors. If the distance between the two vectors is lower than a threshold, the AR system may determine that the two faces match each other. On the other hand, if the distance is greater than or equal to the threshold, the AR system may determine that the two faces are dissimilar.

Besides matching facial features, the AR system may also use other factors to determine whether the person is the same person as described by the identification document. For example, the AR system may determine hair color and eye color of the person from the image. The AR system can also extract the hair color and eye color information from the identification document. If the information determined from the image matches the information extracted from the identification document, the AR system may flag that the person is likely to match the person described by the identification document. On the other hand, if the information determined from the image does not entirely match the information extracted from the identification document, the AR system may show a lower likelihood of match.

Example Process of Matching Multiple Documents

Figure 14:
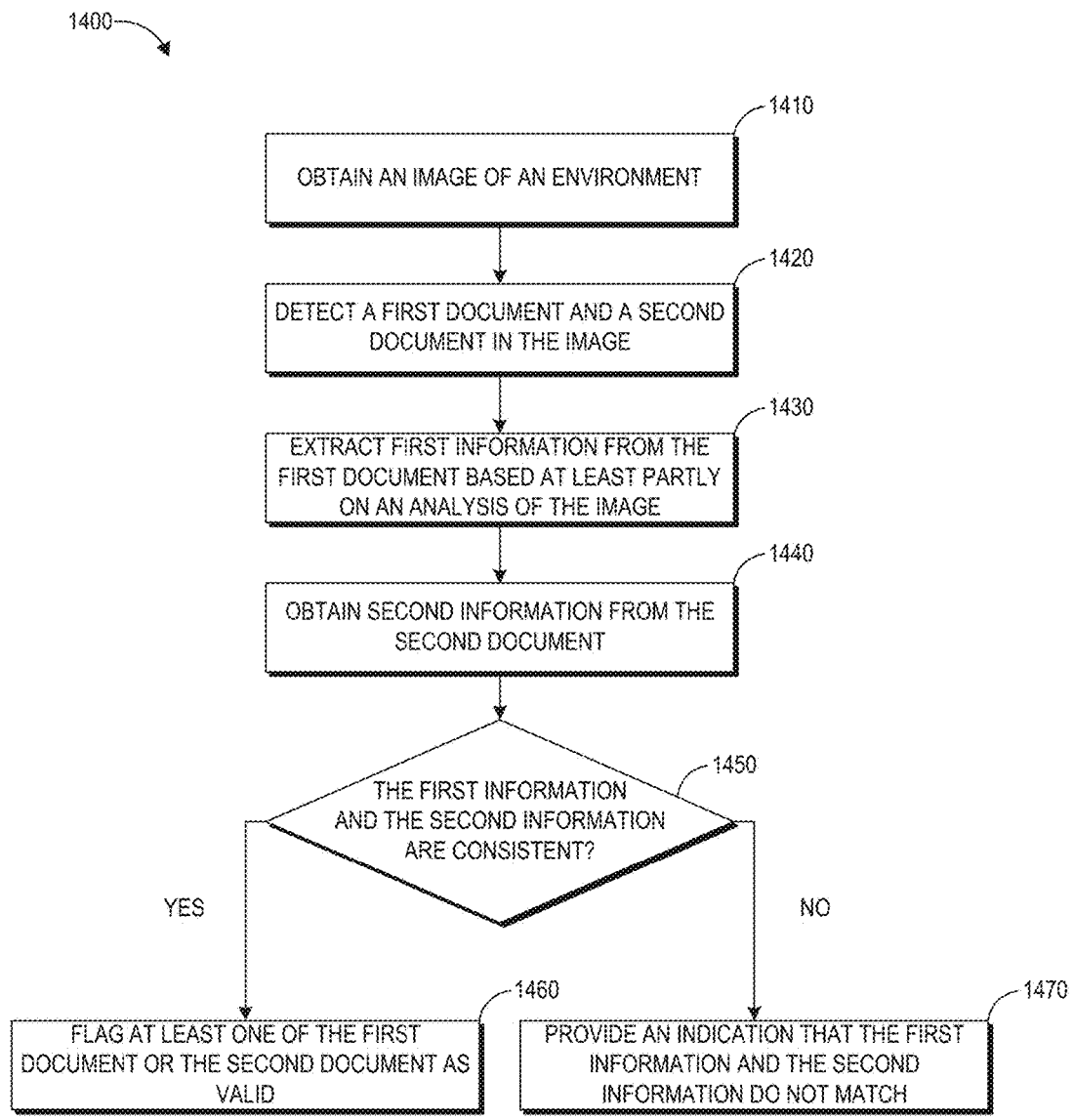
FIG. 14 is a flowchart of an example process for determining a match between two documents.

FIG. 14 is a flowchart of an example process for determining a match between two documents. The process 1400 may be performed by the AR system described herein, although the process 1400 may also be performed by other computing systems such as a robot, a travel check-in kiosk, or a security system.

At block 1410, the AR system can obtain an image of an environment. The AR system can obtain the image using similar techniques as described with reference to the block 1310.

Multiple documents may exist in the image of the environment. For example, at the security check point, the image captured by the AR system may include airline tickets and identification documents held by different customers as well as flyers or other documents in the environment. The AR system may detect one or more of these documents using keypoints recognition techniques, such as by finding the four corners of the documents.

At block 1420, the AR system can detect a first document and a second document among the multiple documents in the image. The AR system may use one or more filters to identify the first and the second document. For example, the AR system may be configured to detecting the documents appearing within a certain distance. As another example, the AR system may be configured to only identify certain types of documents such as identification documents or airline tickets, and exclude other documents such as flyers or informational notices.

The AR system can also identify the first and the second document based on content in the two documents. For example, the AR system may identify the first and second document based on shared information such as the name appearing on the document. In some embodiments, the AR system can look up a document in the environment based on information in another document. For example, the AR system can identify the name on a driver's license and use the name to look for an airline ticket having the same name.

At block 1430, the AR system can extract first information in the document from the image of the document. For example, the AR system may use text recognition and extract the expiration date of an identification document from the image of the identification document.

At block 1440, the AR system can obtain second information associated with the document. For example, the AR system can identify an optical label on the document and scan the optical label using a sensor of the AR system. The AR system can reference to another data source based on the optical label and can obtain additional information not directly perceivable in the document. In some implementations, the first information and the second information may be in the same categories. For example, where the first information is the expiration date of the document, the AR system may scan the optical label and retrieve the expiration date of the document form another data source. Besides expiration date, the categories of information may also include, for example, birthday, expiration date, departure time, hair color, eye color, iris code, etc.

At block 1450, the AR system can determine whether the first information is consistent with the second information. For example, as shown in FIG. 12B, the AR system can determine whether the name on the driver's license matches the name on the airline ticket. As described herein, the matching doesn't require a 100% match. For example, the AR system may detect a match if even though the driver's license has the passenger's full middle name while the airline ticket only has initial of the passenger's middle name.

If the first information matches the second information, at block 1460 the AR system may determine that either the first document or the second document (or both) are valid. The AR system can flag the first document and/or the second document by providing a visual focus indicator (such as a halo around the document). The AR system can also provide a virtual annotation such as the word "MATCH" as shown in FIG. 12A.

On the other hand, if the first information is not consistent with the second information, at block 1470, the AR system may provide an indication that the first information and the second information do not match. For example, the AR system may provide a visual focus indicator such as a highlight to show the inconsistencies between the first information and the second information. In some embodiments, the AR system may determine that at least one of the documents is invalid based on the mismatch between the first information and the second information.

In some implementations, the AR system may compare multiple pieces of information in the document and calculate a confidence score based on the comparisons. The AR system may flag the document as valid (or invalid) by comparing the confidence score with a threshold score.

Example Process of Authenticating a Person Using Multiple Documents

Figure 15:
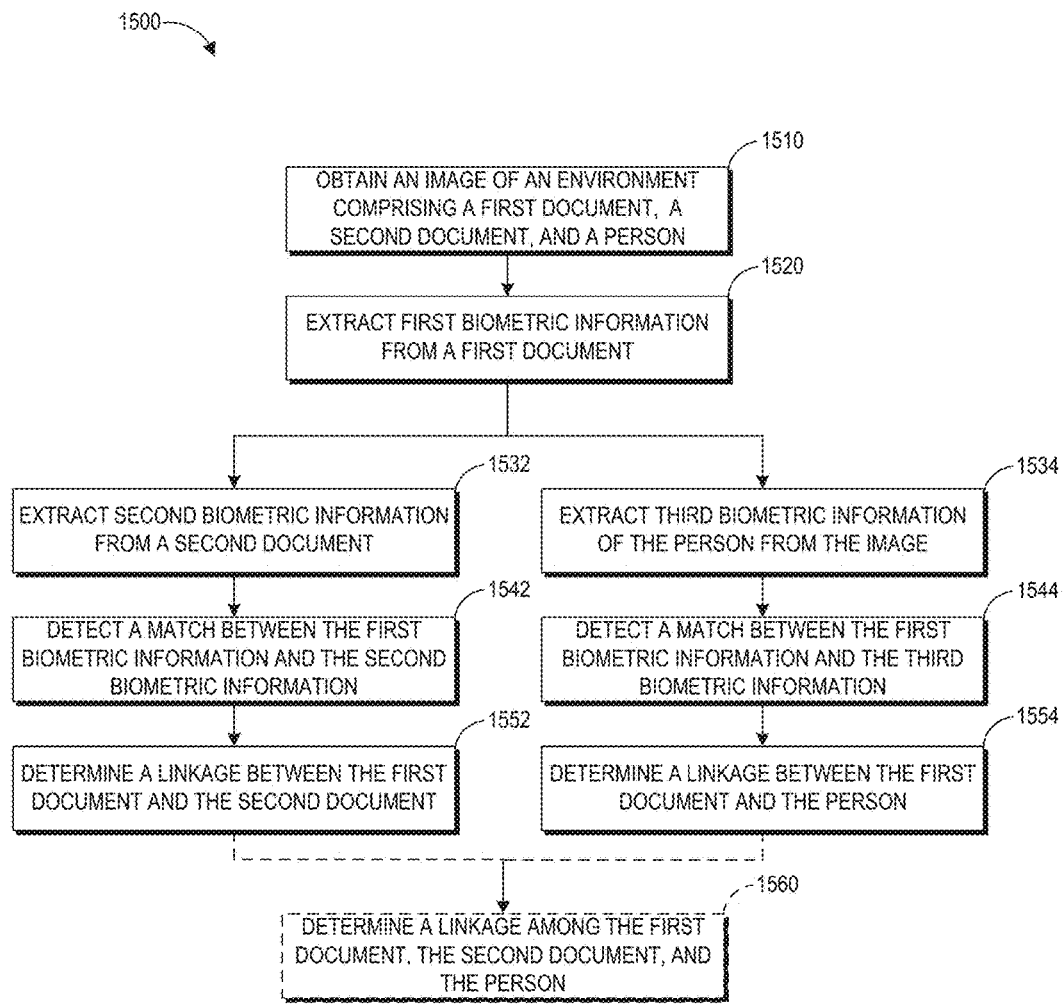
FIG. 15 is a flowchart of example process for determining a match between a person and a plurality of documents.

FIG. 15 is a flowchart of example process for determining a match between a person and a plurality of documents. The process 1500 may be performed by the AR system described herein (e.g., wearable system 200) although the process 1500 may also be performed by other computing systems such as a robot, a travel check-in kiosk, or a security system.

At block 1510, the AR system can obtain an image of an environment. The AR system can obtain the image using the outward-facing imaging system 464 (shown in FIG. 4). The AR system may detect a first document, a second document, and a person in the image. For example, the image as captured by the AR system may include the person holding the first document and the second document.

At block 1520, the AR system can analyze the image of the environment and extract information from the first document. The extracted information may include biometric information of a person.

At block 1532, the AR system can extract information from the second document. The extracted information may include biometric information. The AR system may extract such information by analyzing the image of the second document. The AR system may also extract the information directly from the second document. For example, the AR system may emit light outside of the human visible spectrum (such as UV light) onto the second document and identify information that is not perceivable when illuminated with light within the human visible spectrum. As another example, the AR system may scan an optical label of the second document and use information in the optical label to obtain additional information from another data source.

In some implementations, the information extracted from the first document may be in the same category as the information extracted from the second document. For example, the AR system may identify a name of a person in the first document and identify another name in the second document. At block 1542, the AR system can determine whether the information and the second information match each other, such as whether the name on the first document matches the name on the second document.

At block 1552, the AR system can determine a linkage between the first document and the second document based on the consistency of information in the first and the second document. For example, if the first document and the second document show the same name, it is more likely that a linkage exists between the first and the second document. The AR system may use multiple categories of information in the first and the second document to determine linkage. For example, besides comparing names, the AR system can also compare the residence address of the two documents. If the AR system determines that the two documents have the same name but different addresses, the AR system may determine that the likelihood of the existence of a linkage between the two documents is low. In some embodiments, the AR system may refer another data source to further determine the linkage. For example, the AR system may look up the addresses in a demographic database. If both addresses are linked to the name of the person, the AR system may increase the likelihood of the existence of the linkage between the two documents.

As described herein, in some embodiments, if the AR system determines that the information in the first document and the second document is inconsistent, the AR system may flag the inconsistencies. For example, the AR system determines that the name on the driver's license does not match the name on the airline ticket presented by a person, the AR system may display the word "MISMATCH" or highlight the name of the first and/or the second document.

In addition to or in alternative to the blocks 1532, 1542, and 1552, the AR system may perform the blocks 1534, 1544, and 1554 to detect a linkage. At block 1534, the AR system can extract biometric information of the person from the image of the environment. For example, the AR system may identify a face of the person and analyze facial features of the person.

At block 1544, the AR system can determine whether the biometric information of the person matches the biometric information from the document. As described with reference to FIGS. 12A and 12B, the AR system can determine whether the facial features of the person matches the facial features of the image on an identification document.

At block 1554, the AR system can detect a linkage between a document and a person based on matches of one or more pieces of information. As described with reference to FIGS. 12A and 12B, the AR system may determine similarities and dissimilarities of facial features between the face of the person and the face in the document. The AR system may also use other factors such as whether description of hair color in the document matches the hair color of the person, whether the iris code on the document matches the iris code generated by scanning the person, and so on to determine whether the person is more likely to be the same one as described by the document. The AR system can calculate a confidence score based on one or factors. The AR system can determine whether a linkage exists based on whether the confidence score passes a threshold.

Optionally at block 1560, the AR system can analyze information in the first document, the second document, and the person to determine whether there is a linkage among them. For example, as described with reference to FIG. 12B, the AR system can analyze facial features of the person and use the facial features to look up a person's name in another data source. The AR system can compare this name with the name in the first and the second document and determine whether all three names are consistent. If the names are consistent, then the AR system can create a linkage among the first document, the second document, and the person. Otherwise, the AR system may show the likelihood of the linkage among them, or show that there is no linkage.

In another example, there may be a linkage between the identification document and the person but there may be no linkage with the other document. This could happen, for example, when a person is holding his own driver's license but uses someone else's flight ticket. In this situation, the AR system may be configured not to create a linkage among the two documents, even though a linkage exists between the person and the driver's license. In certain embodiments, the blocks 1552 and 1554 may be optional. For example, the AR system can perform the block 1560 directly without performing the blocks 1552 and 1554.

In some implementations, the AR system can search the surroundings and identify documents that might have a linkage. For example, when the AR system obtains an image with one person holding a driver's license and an airline ticket while another person is holding a different driver's license, the AR system may determine that there is no linkage between the two driver's licenses because they belong to different people. The AR system can search for another document (such as the airline ticket) and determine that the other document and the driver's license have a linkage because, for example, the same person's name appears on both documents.

Although the examples described herein can detect a linkage (e.g., a match/mismatch) between a person and a document, in certain implementations, the AR system can also detect a linkage between two persons. For example, the AR system can detect two faces corresponding with two different individuals in the environment, compare facial features of the two faces, and determine that the individuals look alike (e.g., because they are twins or siblings) or look differently (e.g., because they are unrelated strangers).

Additional Embodiments

In a 1st aspect, a method for matching a person with a document presented by the person, the method comprising: under control of an augmented reality (AR) system comprising computer hardware, the AR system comprising an outward-facing camera configured to image an environment: obtaining, with the outward-facing camera, an image of the environment; detecting a first face in the image, wherein the first face is associated with a person in the environment; detecting a second face in the image, wherein the second face is included in an identification document associated with the person; identifying first facial features associated with the first face; identifying second facial features associated with the second face; and determining a match between the person and the identification document based at least partly on a comparison of the first facial features and the second facial features.

In a 2nd aspect, the method of aspect 1, wherein detecting the first face or detecting the second face comprises locating the first face or the second face in the image using at least one of the following: a wavelet-based boosted cascade algorithm or a deep neural network algorithm.

In a 3rd aspect, the method of any one of aspects 1-2, wherein image comprises a plurality of faces and wherein detecting the first face or detecting the second face comprises applying a filter to identify relevant faces.

In a 4st aspect, the method of any one of aspects 1-3, wherein detecting the second face comprising: analyzing movements of the second face; and detecting the second face in response to a determination that the movements of the second face is described by a single planar homography.

In a 5th aspect, the method of any one of aspects 1-4, wherein identifying the first facial features or identifying the second facial features comprises calculating a first feature vector associated with the first face the based at least partly on the first facial features or calculating a second feature vector associated with the second face based at least partly on the second facial features, respectively.

In a 6th aspect, the method of aspect 5, further comprising assigning first weights to the first facial features based at least partly on locations of the respective first facial features, or assigning second weights to second facial features based at least partly on locations of the respective second facial features.

In a 7th aspect, the method of any one of aspects 5-6, wherein calculating the first feature vector or calculating the second feature vector is implemented using one or more of the following: a facial landmark detection algorithm, a deep neural network algorithm, or a template matching algorithm.

In an 8th aspect, the method of any one of aspects 5-7, wherein determining the match comprises: calculating a distance between the first feature vector and the second feature vector; comparing the distance to a threshold value; and confirming the match when the distance passes the threshold value.

In a 9th aspect, the method of aspect 8, wherein the distance is Euclidean distance.

In a 10th aspect, the method of any one of aspects 1-9, wherein the identification document includes hidden information not directly perceivable when the identification document is illuminated with light within a human visible spectrum (HVS).

In an 11th aspect, the method of any one of aspects 1-10, wherein the hidden information is encoded in a label comprising one or more of the following: a quick response code, a bar code, or an iris code.

In a 12th aspect, the method of aspect 11, wherein the label comprises a reference to another data source.

In a 13th aspect, the method of any one of the aspects 1-12, further comprising: obtaining first biometric information of the person based at least partly on an analysis of the image of the environment; and obtaining second biometric information from the identification document.

In a 14th aspect, the method of aspect 13, wherein obtaining the second biometric information comprises one or more of the following: scanning a label on the identification document to retrieve the hidden information encoded in the label; retrieving biometric information from the other data source using a reference provided by the identification document; or illuminating the identification document with ultraviolet light to reveal hidden information in the identification document, wherein the hidden information is not visible when illuminated with light within the HVS.

In a 15th aspect, the method of any one of aspects 13-14, wherein determining the match further comprises comparing the first biometric information with the second biometric information to determine whether the first biometric information is consistent with the second biometric information.

In a 16th aspect, the method of any one of aspects 13-15, wherein the first biometric information or the second biometric information comprises one or more of the following: a fingerprint, an iris code, a height, a gender, a hair color, an eye color, or a weight.

In a 17th aspect, the method of any one of aspects 1-16, wherein the identification document comprises at least one of the following: driver's license, passport, or state identification card.

In an 18th aspect, a method for verifying an identity of a person using an augmented reality (AR) system, the method comprising: under control of the AR system comprising computer hardware, the AR system comprising an outward-facing camera configured to image an environment and an optical sensor configured to emit light outside of a human visible spectrum (HVS): obtaining, with the outward-facing camera, an image of the environment; identifying a first biometric information associated with a person based at least partly on an analysis of the image of the environment; identifying a second biometric information in a document presented by the person; and determining a match between the first biometric information with the second biometric information.

In a 19th aspect, the method of aspect 18, wherein the light emitted by the optical sensor comprises ultraviolet light.

In a 20th aspect, the method of any one of aspects 18-19, wherein the first biometric information or the second biometric information comprises one or more of the following: a face, a fingerprint, an iris code, a height, a gender, a hair color, an eye color, or a weight.

In a 21st aspect, the method of any one of aspects 18-20, wherein identifying the first biometric information and identifying the second biometric information comprise: detecting a first face in the image, wherein the first face comprises first facial features and is associated with the person; and detecting a second face in the image, wherein the second face comprises second facial features and is included in the document presented by the person.

In a 22nd aspect, the method of aspect 21, wherein detecting the first face or detecting the second face comprises locating the first face or the second face in the image using at least one of the following: a wavelet-based boosted cascade algorithm or a deep neural network algorithm.

In a 23rd aspect, the method of any one of aspects 21-22, wherein determining the match comprises: calculating a first feature vector for the first face the based at least partly on the first facial features or calculating a second feature vector for the second face based at least partly on the second facial features, respectively; calculating a distance between the first feature vector and the second feature vector; comparing the distance to a threshold value; and confirming the match when the distance passes the threshold value.

In a 24th aspect, the method of any one of the aspects 21-23, further comprising assigning first weights to the first facial features based at least partly on locations of the respective first facial features, or assigning second weights to second facial features based at least partly on locations of the respective second facial features.

In a 25th aspect, the method of any one of aspects 23-24, wherein the distance is Euclidean distance.

In a 26th aspect, the method of any one of aspects 23-25, wherein calculating the first feature vector or calculating the second feature vector is implemented using one or more of the following: a facial landmark detection algorithm, a deep neural network algorithm, or a template matching algorithm.

In a 27th aspect, the method of any one of aspects 18-19, wherein identifying the second information comprises: emitting a light, by the optical sensor, onto the document, wherein the light is outside the HVS; and identifying the of information under the light emitted by the optical sensor, wherein the second information is not directly visible when illuminated with light within the HVS.

In a 28th aspect, the method of any one of aspects 18-19, wherein identifying the second information comprises: identifying a label in the document, wherein the label contains encoded biometric information; and retrieving decoded biometric information based at least partly on the analysis of the label.

In a 29th aspect, the method of aspect 28, wherein retrieving decoded biometric information comprises retrieving biometric information from a data source other than the image of the environment.

In a 30th aspect, the method of aspect 29, wherein the document comprises an identification document.

In a 31st aspect, an augmented reality (AR) system comprising an outward-facing camera and computer hardware, the AR system is configured to perform any one of the methods in aspects 1-17.

In a 32nd aspect, an augmented reality (AR) system comprising an outward-facing camera, configured to image an environment and an optical sensor configured to emit light outside of a human visible spectrum, and computer hardware, the AR system is configured to perform any one of the methods in aspects 18-30.

In a 33rd aspect, a method for determining a linkage between two documents using an augmented reality (AR) system, the method comprising: under control of the AR system comprising computer hardware, the AR system comprising an outward-facing camera configured to image an environment and an optical sensor configured to emit light outside of a human visible spectrum (HVS): obtaining an image of the environment; detecting a first document and a second document in the image; extracting first information from the first document based at least in part on an analysis of the image; extracting second information from the second document, wherein the first information and the second information are in a same category; determining a match between the first information and the second information; and in response to a determination that the match exists between the first information and the second information, determining a linkage between the first document and the second document.

In a 34th aspect, the method of aspect 33, wherein the light emitted by the optical sensor comprises ultraviolet light.

In a 35th aspect, the method of any one of aspects 33-34, wherein the first information and the second information comprises a name, an address, expiration date, a picture of a person, a fingerprint, an iris code, a height, a gender, a hair color, an eye color, or a weight.

In a 36th aspect, the method of any one of aspects 33-35, wherein the second information is invisible when illuminated with light within the HVS.

In a 37th aspect, the method of aspect 36, wherein extracting the second information comprises: emitting light, by the optical sensor, onto the second document, wherein at least a portion of the light is outside of the HVS; and identifying the second information under the light emitted by the optical sensor, wherein the second information is not directly visible to the human under a normal optical condition.

In a 38th aspect, the method of any one of aspects 33-36, wherein extracting the second information comprises: identifying a label in the second document, wherein the label contains a reference to another data source; and communicating with the other data source to retrieve the second information.

In a 39th aspect, the method of aspect 38, wherein the label comprises one or more of the following: a quick response code or a bar code.

In a 40th aspect, the method of any one of aspects 33-39, wherein determining the match comprises: comparing the first information and the second information; calculating a confidence score based at least in part on the similarities or dissimilarities between the first information and the second information; and detecting the match when the confidence score passes a threshold value.

In a 41st aspect, the method of any one of aspects 33-40, further comprising: flagging at least one of the first document or the second document as valid based at least partly on the determined match.

In a 42nd aspect, the method of any one of aspects 33-41, further comprising: in response to a determination that a match does not exist between the first information and the second information, providing an indication that the first information and the second information do not match, wherein the indication comprises a focus indicator.

In a 43rd aspect, the method of any one of aspects 33-42, wherein detecting the first document and the second document comprises: identifying the first document and the second document based at least partly on a filter.

In a 44th aspect, a method for determining a linkage between a person and a plurality of documents using an augmented reality (AR) system, the method comprising: under control of the AR system comprising computer hardware, the AR system comprising an outward-facing camera configured to image an environment and an optical sensor configured to emit light outside of a visible spectrum of a human: obtaining an image of the environment; detecting a person, a first document and a second document in the image; extracting first personal information based at least partly on an analysis of the image of the first document; extracting second personal information from the second document; extracting third personal information of the person based at least partly on an analysis of the image of the person, wherein the first personal information, the second personal information, and the third personal information are in a same category; determining a match among the first personal information, the second personal information, and the third personal information; and in response to a determination that a match exists among the first personal information, the second information, and the third personal information, determining a linkage among the first document, the second document, and the person.

In a 45th aspect, the method of aspect 44, wherein the light emitted by the optical sensor comprises ultraviolet light.

In a 46th aspect, the method of any one of aspects 44-45, wherein the first personal information, the second person information, or the third personal information comprises a name, an address, expiration date, a picture of a person, a fingerprint, an iris code, a height, a gender, a hair color, an eye color, or a weight.

In a 47th aspect, the method of aspect 44, wherein extracting the first personal information and extracting the third personal information comprise: detecting a first face in the image, wherein the first face is included in the first document; detecting a second face in the image, wherein the second face is associated with the person in the environment; identifying first facial features associated with the first face; and identifying second facial features associated with the second face.

In a 48th aspect, the method of aspect 47, wherein detecting the first face or detecting the second face comprises locating the first face or the second face in the image using at least one of the following: a wavelet-based boosted cascade algorithm or a deep neural network algorithm.

In a 49th aspect, the method of any one of aspects 47-48, wherein detecting the first face comprising: analyzing movements of the first face; and detecting the first face in response to a determination that the movements of the second face is described by a single planar homography.

In a 50th aspect, the method of any one of aspects 47-49, wherein identifying the first facial features or identifying the second facial features comprises calculating a first feature vector associated with the first face based at least partly on the first facial features or calculating a second feature vector associated with the second face based at least partly on the second facial features, respectively.

In a 51st aspect, the method of aspect 50, further comprising assigning first weights to the first facial features based at least partly on locations of the respective first facial features, or assigning second weights to second facial features based at least partly on locations of the respective second facial features.

In a 52nd aspect, the method of any one of aspects 50-51, wherein calculating the first feature vector or calculating the second feature vector is implemented using one or more of the following: a facial landmark detection algorithm, a deep neural network algorithm, or a template matching algorithm.

In a 53rd aspect, the method of any one of aspects 47-52, wherein determining the match comprises: calculating a distance between the first feature vector and the second feature vector; comparing the distance to a threshold value; and confirming the match when the distance passes the threshold value.

In a 54th aspect, the method of aspect 53, wherein the distance is Euclidean distance.

In a 55th, aspect, the method of aspect 44-54, wherein the second personal information is invisible when illuminated with light within the HVS.

In a 56th aspect, the method of aspect 55, wherein extracting the second personal information comprises: emitting light, by the optical sensor, onto the second document, wherein at least a portion of the light is outside of the HVS; and identifying the second personal information under the light emitted by the optical sensor, wherein the second personal information is not directly visible to the human under a normal optical condition.

In a 57th aspect, the method of any one of aspects 44-55, wherein extracting the second personal information comprises: identifying a label in the second document, wherein the label contains a reference to another data source; and communicating with the other data source to retrieve the second personal information.

In a 58th aspect, the method of aspect 57, wherein the label comprises one or more of the following: a quick response code or a bar code.

In a 59th aspect, the method of any one of aspects 44-58, wherein determining the match comprises: comparing the first personal information and the second personal information; calculating a confidence score based at least in part on the similarities or dissimilarities between the first personal information and the second personal information; and detecting the match when the confidence score passes a threshold value.

In a 60th aspect, the method of any one of aspects 44-59, further comprising: flagging at least one of the first document or the second document as valid based at least partly on the detected match.

In a 61st aspect, the method of any one of aspects 44-60, further comprising: in response to a determination that the match does not exist among at least two of: the first personal information, the second personal information, and the third personal information, providing an indication showing that the match does not exist.

In a 62nd aspect, the method of aspect 61, further comprising: searching in the environment, a fourth document comprising information that match at least one of: the first personal information, the second personal information, or the third personal information.

In a 63rd aspect, the method of any one of aspects 44-62, wherein the first document or the second document comprises: an identification document or an airline ticket.

In a 64th aspect, the method of any one of aspects 44-63, wherein detecting a person, a first document and a second document in the image comprises: identifying the person, the first document, or the second document based at least partly on a filter.

In a 65th aspect, an augmented reality (AR) system comprising computer hardware, the AR system comprising an outward-facing camera configured to image an environment, and an optical sensor configured to emit light outside of a human visible spectrum, the AR system is configured to perform any one of the methods in aspects 33-64.

In a 66th aspect, an augmented reality (AR) system for detecting a linkage in an AR environment, the augmented reality system comprising: an outward-facing imaging system configured to image an environment of the AR system; an AR display configured to present virtual content in a three-dimensional (3D) view to a user of the AR system; and a hardware processor programmed to: obtain, with the outward-facing imaging system, an image of the environment; detect a first face and a second face in the image, wherein the first face is the face of a person in the environment and wherein the second face is a face on an identification document; recognize the first face based on first facial features associated with the first face; recognize the second face based on the second facial features; analyze the first facial features and the second facial features to detect a linkage between the person and the identification document; and instruct the AR display to present a virtual annotation indicating a result of the analysis of the first facial features and the second facial features.

In a 67th aspect, the AR system of aspect 66, wherein to detect the first face and the second face, the hardware processor is programmed to apply at least one of the following algorithms on the image: a wavelet-based boosted cascade algorithm or a deep neural network algorithm.

In a 68th aspect, the AR system of any one of aspects 66-67, wherein the hardware processor is further programmed to: detect that the second face is the face on the identification document by analyzing a movement of the second face; and determine whether the movement is described by a single planar homography.

In a 69th aspect, the AR system of any one of aspects 66-68, wherein to recognize the first face or the second face, the hardware processor is programmed to: calculate a first feature vector associated with the first face based at least partly on the first facial features or calculate a second feature vector associated with the second face based at least partly on the second facial features, respectively, by applying at least one of: a facial landmark detection algorithm, a deep neural network algorithm, or a template matching algorithm.

In a 70th aspect, the AR system of aspect 69, wherein to detect the linkage between the person and the identification document, the hardware processor is programmed to: calculate a distance between the first feature vector and the second feature vector; compare the distance to a threshold value; and detect the linkage in response to a determination that the distance passes the threshold value.

In a 71st aspect, the AR system of aspect 70, wherein the distance is a Euclidean distance.

In a 72nd aspect, the AR system of any one of aspects 66-71, wherein the identification document has a label comprising one or more of the following: a quick response code, a bar code, or an iris code.

In a 73rd aspect, the AR system of aspect 72, wherein the hardware processor is further programmed to: identify the label from the image of the environment; and access an external data source using the label to retrieve biometric information of the person.

In a 74th aspect, the AR system of any one of aspects 66-73, wherein AR system further comprises an optical sensor configured to illuminate light outside of a human visible spectrum (HVS), and the hardware processor is further programmed to: instruct the optical sensor to illuminate the light toward the identification document to reveal hidden information in the identification document; analyze an image of the identification document wherein the image is acquired when the identification document is illuminated with the light; and extract biometric information from the image, wherein the extracted biometric information is used to detect the linkage between the person and the identification document.

In a 75th aspect, the AR system of any one of aspects 66-74, wherein the hardware processor is programmed to calculate a likelihood of a match between the first facial features and the second facial features.

In a 76th aspect, the AR system of any one of aspects 66-75, wherein the annotation comprises a visual focus indicator linking the person and the identification document.

In a 77th aspect, a method for detecting a linkage in an augmented reality environment, the method comprising: under control of an augmented reality device comprising an outward-imaging imaging system and a hardware processor, the augmented reality device configured to display virtual content to a wearer of the augmented reality device: obtaining an image of the environment; detecting a person, a first document, and a second document in the image; extracting first personal information based at least partly on an analysis of the image of the first document; accessing second personal information associated with second document; extracting third personal information of the person based at least partly on an analysis of the image of the person, wherein the first personal information, the second personal information, and the third personal information are in a same category; determining a likelihood of match among the first personal information, the second personal information, and the third personal information; and displaying a linkage of among the first document, the second document, and the person in response to a determination that the likelihood of match exceeds a threshold condition.

In a 78th aspect, the method of aspect 77, wherein obtaining the image of the environment comprises accessing the image acquired by the outward-facing imaging system of the augmented reality device.

In a 79th aspect, the method of any one of aspects 77-78, wherein extracting the first personal information and the third personal information comprises: detecting a first face in the image, wherein the first face is included in the first document; detecting a second face in the image, wherein the second face is associated with the person in the environment; identifying first facial features associated with the first face and second facial features associated with the second face; and recognizing the first face and the second face based on the first facial features and the second facial features respectively.

In an 80th aspect, the method of aspect 79, wherein detecting the first face or detecting the second face comprises applying: a wavelet-based boosted cascade algorithm or a deep neural network algorithm.

In an 81st aspect, the method of any one of aspects 79-80, wherein recognizing the first face and recognizing the second face comprises: calculating a first feature vector associated with the first face based at least partly on the first facial features; and calculating a second feature vector associated with the second face based at least partly on the second facial features, respectively, by applying at least one of: a facial landmark detection algorithm, a deep neural network algorithm, or a template matching algorithm.

In an 82nd aspect, the method of any one of aspects 77-81, wherein accessing the second personal information comprises: acquiring an image of the second document when a light is shed onto the second document and wherein at least a portion of the light is outside of human visible spectrum; and identifying the second personal information based on the acquired image of the second document, wherein the second personal information is not directly visible to the human under a normal optical condition.

In an 83rd aspect, the method of any one of aspects 77-82, wherein accessing the second personal information comprises: identifying the label from the image of the environment; and accessing a data source storing personal information of a plurality of persons using the label to retrieve biometric information of the person.

In an 84th aspect, the method of any one of aspects 77-83, wherein determining a likelihood of match comprises: comparing the first personal information and the second personal information; calculating a confidence score based at least in part on the similarities or dissimilarities between the first personal information and the second personal information.

In an 85th aspect, the method of aspect 84, further comprising: displaying a virtual annotation indicating at least one of the first document or the second document as valid in response to a determination that the confidence score exceeds a threshold value.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An augmented reality (AR) system for detecting a linkage in an AR environment, the augmented reality system comprising:
    an outward-facing imaging system configured to image an environment of the AR system;
    an AR display configured to present virtual content in a three-dimensional (3D) view to a user of the AR system; and
    a hardware processor programmed to:
        obtain, with the outward-facing imaging system, an image of the environment;
        detect a first face and a second face in the image;
        identify the first face in the image as representing a face of a person in the environment and the second face in the image as representing a photograph of a face on an identification document in the environment;
        recognize the first face based on first facial features associated with the first face;
        recognize the second face based on second facial features associated with the second face;
        analyze the first facial features and the second facial features to detect a linkage between the person and the identification document; and
        instruct the AR display to present a virtual annotation indicating a result of the analysis of the first facial features and the second facial features.

2. The AR system of claim 1, wherein to detect the first face and the second face, the hardware processor is programmed to apply at least one of the following algorithms on the image: a wavelet-based boosted cascade algorithm or a deep neural network algorithm.

3. The AR system of claim 1, wherein the hardware processor is further programmed to:
    detect that the second face is the face on the identification document by analyzing a movement of the second face; and
    determine whether the movement is described by a single planar homography.

4. The AR system of claim 1, wherein to recognize the first face or the second face, the hardware processor is programmed to:
    calculate a first feature vector associated with the first face based at least partly on the first facial features or calculate a second feature vector associated with the second face based at least partly on the second facial features, respectively, by applying at least one of: a facial landmark detection algorithm, a deep neural network algorithm, or a template matching algorithm.

5. The AR system of claim 4, wherein to detect the linkage between the person and the identification document, the hardware processor is programmed to:
    calculate a distance between the first feature vector and the second feature vector;

compare the distance to a threshold value; and detect the linkage in response to a determination that the distance passes the threshold value.

6. The AR system of claim 5, wherein the distance is a Euclidean distance.

7. The AR system of claim 1, wherein the identification document has a label comprising one or more of the following: a quick response code, a bar code, or an iris code.

8. The AR system of claim 7, wherein the hardware processor is further programmed to:

identify the label from the image of the environment; and access an external data source using the label to retrieve biometric information of the person.

9. The AR system of claim 1, wherein AR system further comprises an optical sensor configured to illuminate light outside of a human visible spectrum (HVS), and the hardware processor is further programmed to:

instruct the optical sensor to illuminate the light toward the identification document to reveal hidden information in the identification document;

analyze an image of the identification document wherein the image is acquired when the identification document is illuminated with the light; and extract biometric information from the image, wherein the extracted biometric information is used to detect the linkage between the person and the identification document.

10. The AR system of claim 1, wherein the hardware processor is programmed to calculate a likelihood of a match between the first facial features and the second facial features.

11. The AR system of claim 1, wherein the annotation comprises a visual focus indicator linking the person and the identification document.

12. The AR system of claim 11, wherein the annotation comprises a box around the first face and a box around the second face.

13. The AR system of claim 12, wherein the box around the first face and the box around the second face have the same color.

14. The AR system of claim 11, wherein the annotation comprises a line connecting the first face and the second face.

* * * * *